United States Patent [19]
Kusaka et al.

[11] Patent Number: 5,191,201
[45] Date of Patent: Mar. 2, 1993

[54] CAMERA WITH FOCUS DETECTING DEVICE FOR REMOVING VIGNETTING EFFECTS

[75] Inventors: Yosuke Kusaka; Ken Utagawa, both of Kawasaki, Japan

[73] Assignee: Nikon Corporation, Tokyo, Japan

[21] Appl. No.: 795,262

[22] Filed: Nov. 19, 1991

Related U.S. Application Data

[60] Continuation of Ser. No. 540,324, Jun. 19, 1990, abandoned, which is a division of Ser. No. 506,553, Apr. 9, 1990, Pat. No. 4,977,311, which is a continuation of Ser. No. 418,899, Oct. 6, 1989, abandoned, which is a continuation of Ser. No. 262,151, Oct. 12, 1988, abandoned, which is a continuation of Ser. No. 77,290, Jul. 24, 1987, abandoned, which is a division of Ser. No. 661,456, Oct. 16, 1984, Pat. No. 4,687,917.

[30] Foreign Application Priority Data

Oct. 19, 1983 [JP] Japan .................................. 58-195434
Jan. 31, 1984 [JP] Japan .................................. 59-15509
Jul. 4, 1984 [JP] Japan .................................. 59-138809

[51] Int. Cl.$^5$ .................................................. G01J 1/20
[52] U.S. Cl. .................................. 250/201.8; 354/408
[58] Field of Search ..................... 250/201.2, 201.8; 354/404, 407, 408

[56] References Cited

U.S. PATENT DOCUMENTS 4,387,975  6/1983  Araki .................................. 250/201.8
4,497,561  2/1985  Suzuki .................................. 354/408
4,532,420  7/1985  Nakajima .......................... 250/201.8
4,559,446 12/1985  Suzuki .................................. 354/408
4,560,863 12/1985  Matsumura et al. ............. 250/201.2

*Primary Examiner*—David C. Nelms
*Assistant Examiner*—K. Shami
*Attorney, Agent, or Firm*—Shapiro and Shapiro

[57] ABSTRACT

A focus detecting device for detecting the focus adjusted state of an imaging optical system with respect to an object body comprises first and second photoelectric element arrays each including a plurality of photoelectric elements arranged in one direction, a focus detecting optical system for forming first and second optical images of the body on or near the first and second arrays by first and second light beams passed through different first and second areas, respectively, of the exit pupil of the imaging optical system, the first array producing a series of first output signals having a distribution pattern associated with the illumination intensity distribution pattern of the first image, the second array producing a series of second output signals having a distribution pattern associated with the illumination intensity distribution pattern of the second image, focus detection means for producing a focus detection signal representative of the focus adjusted state of the imaging optical system, on the basis of the first and second output signals, and vignetting detection means for detecting, on the basis of the first and second output signals, the vignetting influence of the first and second output signals by the vignetting of the first and second images caused by the imaging optical system.

23 Claims, 16 Drawing Sheets

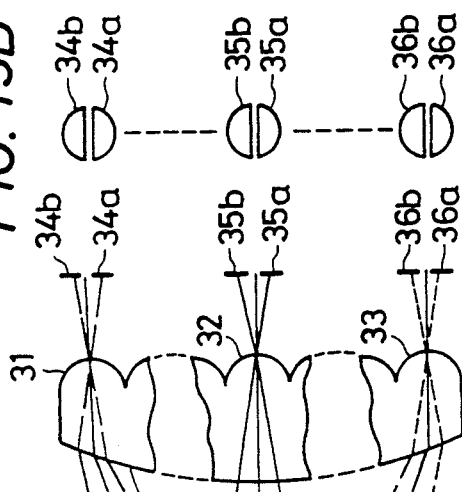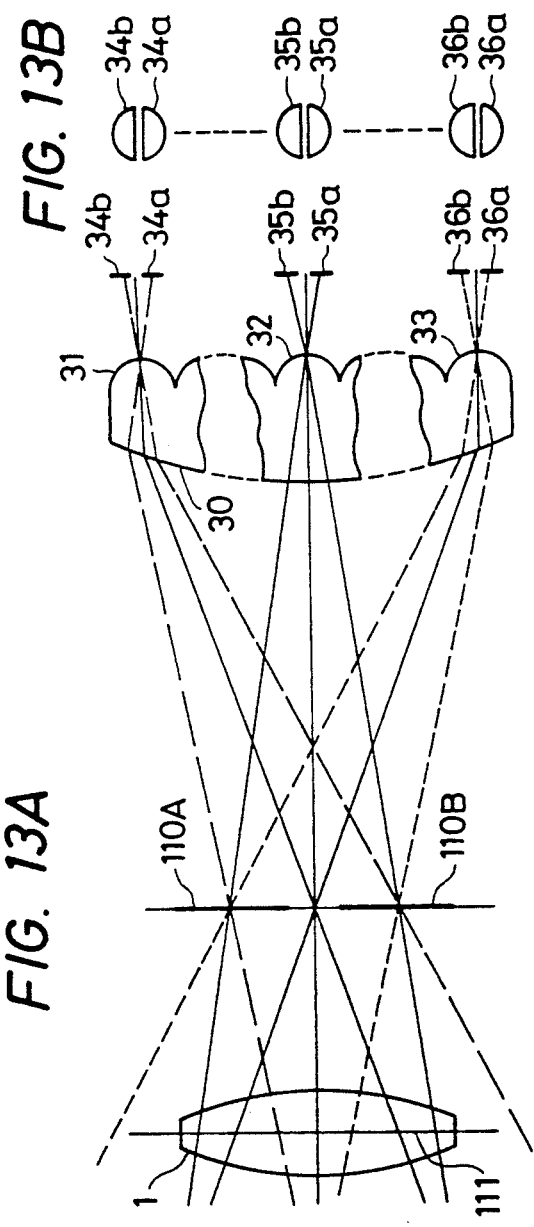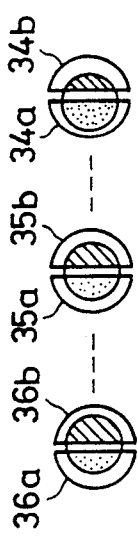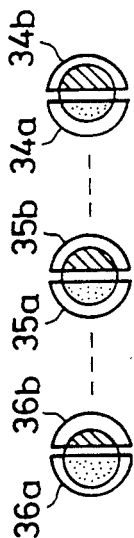

CAMERA WITH FOCUS DETECTING DEVICE FOR REMOVING VIGNETTING EFFECTS

This is a continuation of application Ser. No. 540,324 filed Jun. 19, 1990 (abandoned); which is a division of application Ser. No. 506,553 filed Apr. 9, 1990 (now U.S. Pat. No. 4,977,311 issued Dec. 11, 1990; which is a continuation of application Ser. No. 418,899 filed Oct. 6, 1989 (abandoned); which is a continuation of application Ser. No. 262,151 filed Oct. 12, 1988 (abandoned); which is a continuation of application Ser. No. 77,290 filed Jul. 24, 1987 (abandoned); which is a division of application Ser. No. 661,456 filed Oct. 16, 1984 (now U.S. Pat. No. 4,687,917 issued Aug. 18, 1987).

BACKGROUND OF THE INVENTION

1. Field of the Invention

This invention relates to a focus detecting device for forming optical images of substantially the same object on a pair of photoelectric element arrays by two light beams passed through two different areas of the exit pupil of an imaging optical system such as a photo-taking lens and effecting focus detection from the relative image displacement amount of the two optical images.

2. Description of the Prior Art

Focus detecting devices of this kind have been adopted in single lens reflex cameras, video cameras, etc., and generally the following two types of such devices are known. The first type is a system in which, as shown in U.S. Pat. No. 4,264,810, primary images of an object formed by a photo-taking lens are re-imaged on a pair of photoelectric element arrays by a pair of re-imaging optical system, and the second type is a system in which, as described in U.S. Pat. No. 4,185,191, a row of minute lenses are disposed substantially on the focal plane of a photo-taking lens and a pair of photoelectric elements are provided behind each of the minute lenses.

Such focus detecting devices suffer from a disadvantage that if a pair of light beams used for focus detection, i.e., light beams forming optical images on the pair of photoelectric element arrays, are vignetted by the aperture or the like of the photo-taking lens, the focus detecting accuracy will be reduced greatly.

SUMMARY OF THE INVENTION

It is therefore an object of the present invention to provide a focus detecting device in which the reduction in focus detection accuracy can be greatly lessened even if the focus detecting light beams are vignetted by the aperture or the like of the imaging optical system.

The invention will become fully apparent from the following detailed description thereof taken in conjunction with the accompanying drawings.

BRIEF DESCRIPTION OF THE DRAWINGS

FIG. 13A shows another focus detecting optical system.

FIG. 13B is a front view of the photo-electric element array of FIG. 13A.

FIGS. 14A and 14B show the positional relation between the focus detecting light beam when subjected to the influence of vignetting and the photoelectric element array.

DETAILED DESCRIPTION OF THE PREFERRED EMBODIMENTS

Figure 1:
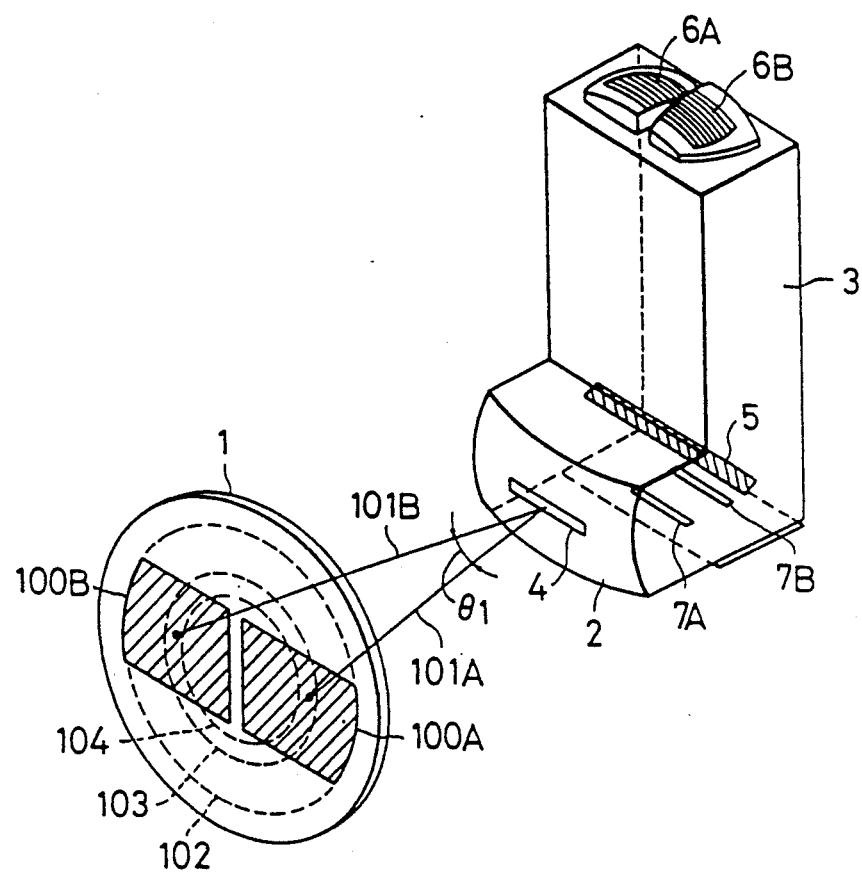
FIG. 1 is a perspective view showing a focus detecting optical system according to an embodiment of the present invention.

Referring to FIG. 1, a field lens 2 is provided on or near the predetermined focal plane of an interchangeable photo-taking lens 1 such as the photo-taking lens of a single lens reflex camera. This field lens 2 is formed on one end of a focus detecting optical block 3 formed of transparent plastic or glass, and the other portion thereof than the rectangular focus detecting area 4 is treated for light interception. The formation of this focus detecting area 4 may be such that a light-intercepting plate having the rectangular opening is disposed immediately in front of the field lens 2. The light beams 101A and 101B from an object to be photographed passed through different areas 100A and 100B of the exit pupil of the photo-taking lens 1 form the primary images of the object to be photographed near the detecting area 4. The light beams 101A and 101B having entered the focus detecting optical system 3 from the detecting area 4 are both reflected upwardly by a reflecting surface 5, and one light beam 101A is further reflected by a concave mirror 6A which serves as a re-imaging optical system, and forms the secondary image of the object to be photographed on a photoelectric element array 7A. The other light beam 101B is further reflected by a similar concave mirror 6B and forms the secondary image of the object to be photographed on a photoelectric element array 7B. Each of the arrays 7A and 7B is comprised of a number of photoelectric elements arranged in one direction. Of course, the juxtaposed concave mirrors 6A and 6B are inclined at different angles to form secondary images on the juxtaposed photoelectric element arrays 7A and 7B. The power of the field lens 2 is determined so that the concave mirrors 6A, 6B and hatching areas 100A, 100B are in conjugate relation with each other. Accordingly, the sizes of the hatching areas 100A and 100B are determined by the sizes, respectively, of the corresponding concave mirrors 6A and 6B. Only the light beams 101A and 101B passed through the hatching areas 100A and 100B of the photo-taking lens 1 arrive at the photoelectric element arrays 7A and 7B and therefore, these areas 100A and 100B are referred to as the set pupils. In this example shown, the exit pupil position of the photo-taking lens and the setting pupil position of the focus detecting optical system 3 are coincident with each other in the direction of the optic axis. Also, the pair of concave mirrors 6A and 6B are adjusted so that the images of the photoelectric element arrays 7A and 7B overlap each other on the detecting area 4.

The relation between the amount of relative image displacement of the optical images on the photoelectric element arrays 7A, 7B and the amount of defocus (the defocus amount is the amount of displacement between the predetermined focal plane of the photo-taking lens and an object image formed by the photo-taking lens along the direction of the optical axis) will hereinafter be described.

When the amount of defocus is P and the amount of relative image displacement is ZT, there is the following relation:

$$P = K \times \frac{1}{\theta} \times ZT,$$

where K is a coefficient determined by the characteristic of the focus detecting optical system 3 including the magnifications of the concave mirrors 6A and 6B, and $\theta$ is the angle formed by straight lines passing through the center of the detecting area 4 and the centers of the areas of the set pupils 100A and 100B, and will hereinafter be referred to as the detection opening angle.

The amount of relative image displacement ZT is a value found from the operation of the image outputs of the photoelectric element arrays 7A and 7B, and K is a value determined only by the focus detecting optical system as described above. However, the detection opening angle $\theta$ is a value varied by the brightness of the photo-taking lens, i.e., the fully open aperture value Fo. More particularly, when the diameter of the exit pupil of the photo-taking lens determined by the fully open aperture value Fo, of the photo-taking lens 1, is greater than that of the circumscribed circle of the set pupils 100A, 100B determined by the sizes of the concave mirrors 6A, 6B, the light beams passing through the areas 100A and 100B are not vignetted at all and the then detection opening angle $\theta$ is $\theta_1$ as shown. However, if a lens having a greater fully open aperture value is used as the photo-taking lens 1 and the diameter of the exit pupil thereof is smaller as indicated by dotted line 103 or 104, said light beams will be vignetted and only the light beams passing through the set pupils 100A and 100B within the dotted line 103 or 104 will arrive at the photoelectric element arrays 7A and 7B after all. Accordingly, the then detection opening angle is smaller than said value $\theta_1$.

Figure 2:
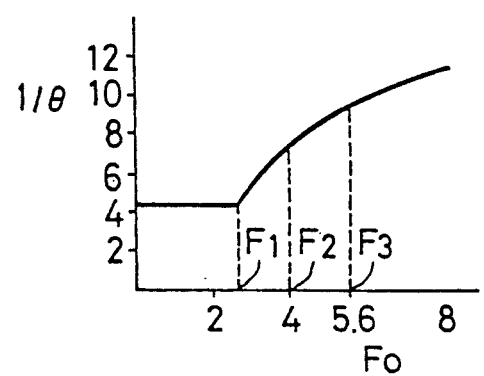
FIG. 2 is a graph showing the relation between the fully open aperture value Fo of the photo-taking lens and the defocus amount conversion factor $1/\theta$.

FIG. 2 is a graph showing the relation between the fully open aperture value Fo of the photo-taking lens and the conversion factor $1/\theta$. In this graph, the pupil diameters 102, 103 and 104 are shown as F1=2.4, F2=4 and F3=5.6, respectively. When the open aperture value of the photo-taking lens is smaller than F1, said vignetting does not occur and therefore the factor $1/\theta$ is constant, but when the fully open aperture value of the photo-taking lens is greater than F1, the amount of vignetting becomes greater in accordance with the increase in the aperture value and therefore the factor $1/\theta$ also increases.

Accordingly, when the amount of image displacement ZT is to be converted into the amount of defocus P, the detection opening angle $\theta$ must be corrected in accordance with the degree to which the light beams passing through the set pupils 100A and 100B are vignetted by the photo-taking lens, and more specifically, in accordance with the fully open aperture value of the photo-taking lens.

Of course, in the foregoing description, the abscissa of FIG. 2 is the open aperture value Fo because, in the photo-taking lens of a single lens reflex camera, focus detection is generally effected in the fully open aperture state, but where focus detection is effected in a state in which the aperture has been stopped down from the open aperture, the amounts of vignetting of the focus detecting light beams 101A and 101B in such stopped-down state offer a problem and therefore, the value of the abscissa of FIG. 2 is the aperture value in such stopped-down state. Generally speaking, the degree of vignetting is determined by the aperture value of the photo-taking lens during focus detection and therefore, the abscissa of FIG. 2 represents the aperture value of the photo-taking lens during focus detection.

Increasing the dimensions of the setting pupils 100A and 100B leads to an advantage that the quantity of light entering the photoelectric element arrays 7A, 7B naturally increases and the S/N ratio of the image outputs of the arrays 7A and 7B is improved. When the set pupils 100A and 100B are to be determined greatly, it is desirable to determine the shape of the areas 100A and 100B so that, as shown in FIG. 1, the dimensions in the direction of arrangement thereof (the lateral direction as viewed in FIG. 1) are greater than the dimensions in a direction perpendicular thereto. The reason is that if the dimensions in the perpendicular direction is made greater, the angle of relative inclination of the concave mirrors 6A and 6B will become greater and this will aggravate the aberrations of the focus detecting optical system 3.

An influence which the vignetting of the focus detecting light beams caused by the aperture diameter of the photo-taking lens imparts to the conversion factor of the amount of defocus has been described above, and another influence which said vignetting imparts to the amount of defocus will hereinafter be described.

It is necessary as a matter of course that the amount of relative image displacement of the optical image on the photoelectric element array 7A and the optical image on the photoelectric element array 7B be equal at any positions on the photoelectric element arrays. However, if vignetting occurs to the focus detecting light beams, the amount of relative image displacement will differ depending on the positions on the photoelectric element arrays.

Figure 3A:
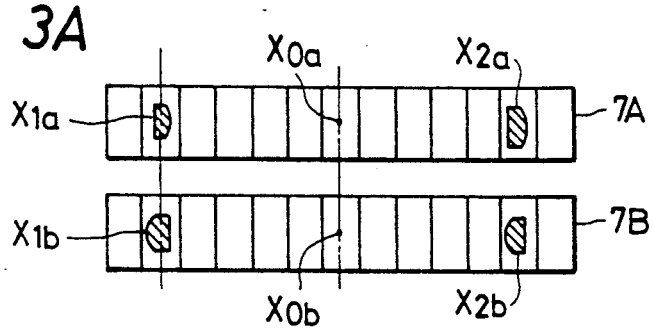
FIGS. 3A, 3B and 3C are plan views schematically showing the positions of the optical images on photoelectric element arrays.
Figure 3B:
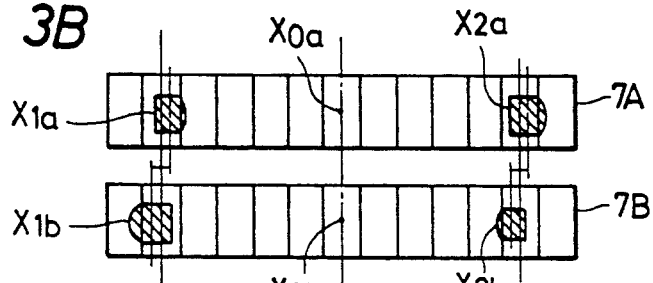
Figure 3C:
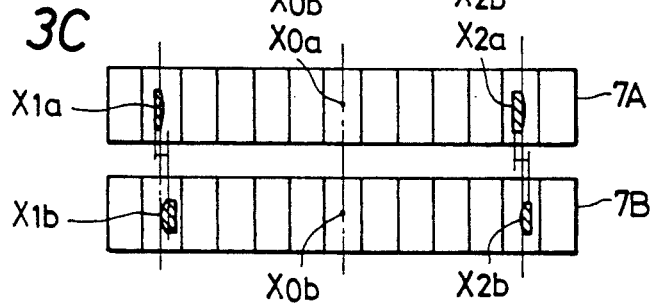

FIGS. 3A, 3B and 3C show the images of three point light sources lying equidistantly from the camera, on the photoelectric element arrays 7A and 7B. FIG. 3A shows the images $X_{0a}$, $X_{1a}$, $X_{2a}$, $X_{0b}$, $X_{1b}$ and $X_{2b}$ of three point light sources when a photo-taking lens of the fully open aperture value F2, i.e., exit pupil diameter 103, is used, and the images $X_{0a}$ and $X_{0b}$ at the center of the photoelectric element arrays are point images, while the images $X_{1a}$, $X_{1b}$, $X_{2a}$ and $X_{2b}$ near the opposite ends of the photoelectric element arrays are blurred images because of the aberrations of the focus detecting optical system 3. FIGS. 3B and 3C show the images when photo-taking lenses of the fully open aperture value F1 and F3, respectively, are used. The focus detecting optical system 3 is pre-adjusted so that when a photo-taking lens of the aperture value F2 causing vignetting is used, the images $X_{0a}$ and $X_{0b}$ at the center of the photoelectric element arrays are substantially point images as shown in FIG. 3A and the relative position of the centers of gravity of the images is coincident with respect to the corresponding images $X_0$ and $X_{0b}$, $X_{1a}$ and $X_{1b}$, and $X_{2a}$ and $X_{2b}$. If the focus detecting optical system 3 is so adjusted, when a photo-taking lens having aperture value smaller than F2, for example, a photo-taking lens of the aperture value F1 is used, the degree of vignetting of the focus detecting light beams is smaller than in the case of a photo-taking lens of aperture value F2 (there is no vignetting for F1) and therefore, as shown in FIG. 3B, the blurred images $X_{1a}$, $X_{1b}$, $X_{2a}$ and $X_{2b}$ become larger and the center of gravity of the corresponding images is displaced in the opposite direction and accordingly, the relative position of the corresponding images $X_{1a}$ and $X_{1b}$, $X_{2a}$ and $X_{2b}$ is displaced by an amount indicated by arrow. On the other hand, when a photo-taking lens of F3 greater than F2 is used, the degree of said vignetting is greater in the photo-taking lens of F3 than in the photo-taking lens of F2 and therefore, as shown in FIG. 3C, the relative position of the corresponding images near the end portions of the arrays 7A and 7B is displaced conversely to the case of FIG. 3B.

Such displacement of the relative position of the optical images corresponding to the location on the photoelectric element arrays naturally reduces the detection accuracy of the amount of defocus and must be corrected.

Figure 4A:
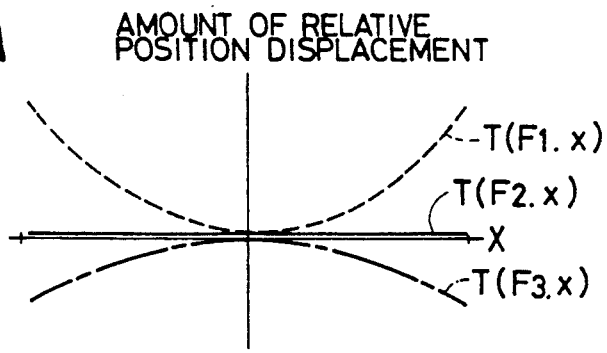
FIGS. 4A and 4B are graphs showing the relative position displacement amount of the optical images on a pair of photoelectric element arrays which corresponds to the location.

FIG. 4A is a graph in which the abscissa represents the position x on the photoelectric element array and the ordinate represents the amount of relative position displacement of said optical image and which shows the variation in the amount of relative position displacement when the aperture value of the photo-taking lens varies. A function $T(F2, x)$ relates to the case where the photo-taking lens of aperture value F2 shown in FIG. 3A is used, and in this case, no relative position displacement occurs. Functions $T(F1, x)$ and $T(F3, x)$ show the cases where the photo-taking lenses of aperture values F1 and F3 shown in FIGS. 3B and 3C are used, and in these cases, as x becomes greater, the amount of position displacement becomes greater.

In the foregoing description, the focus detecting optical system has been described as being pre-adjusted so that said relative position displacement never occurs with regard to the images at the center of the photoelectric element arrays and that said relative position displacement does not occur over the entire area of the photoelectric element arrays when the photo-taking lens of medium aperture value F2 is used, but such adjustment is not limited to what has been described above.

Description will hereinafter be made of an embodiment of the present invention in which both of the two factors of the defocus amount detection accuracy by the above-described vignetting of the focus detecting light beams are corrected. This embodiment is an example in which the focus detecting device according to the present invention is incorporated into a single lens reflex camera.

Figure 5:
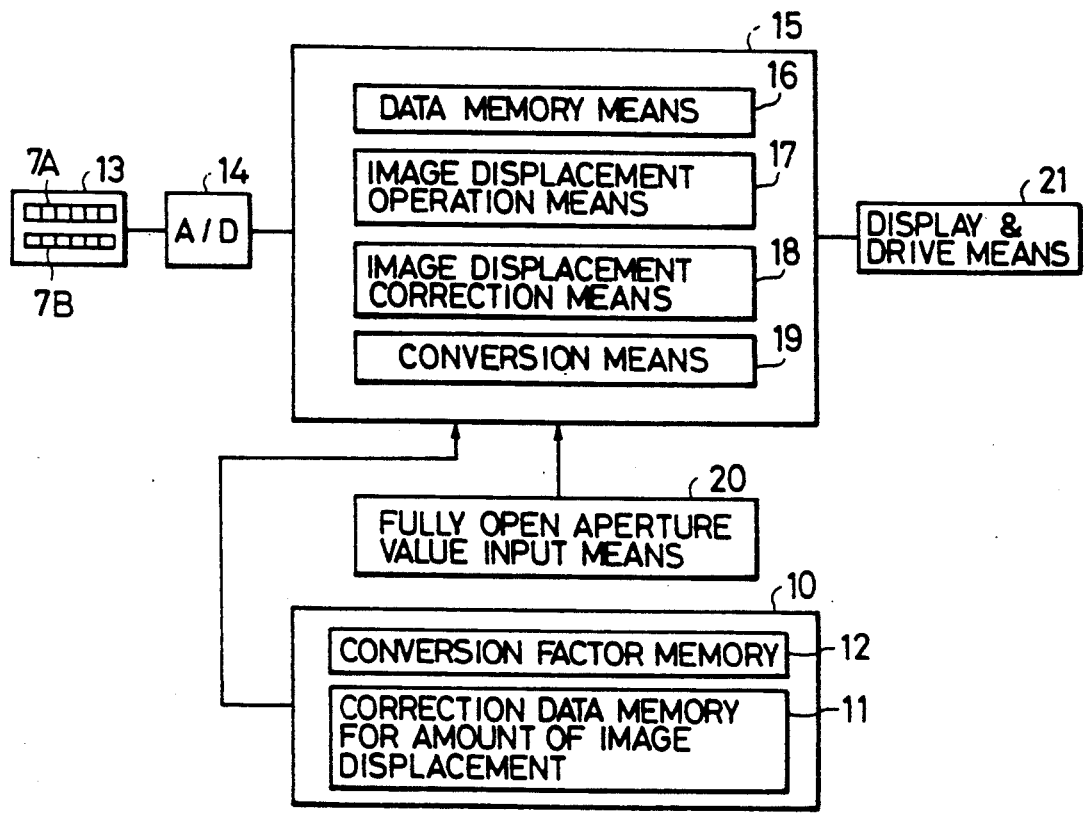
FIG. 5 is a block diagram showing a signal processing system according to an embodiment of the present invention.

Referring to FIG. 5, correction data memory means 10 includes a correction data memory 11 for amount of image displacement and a defocus amount conversion factor memory 12. The memory 11 stores therein the relative position displacement function $T(F, x)$ as shown in FIG. 4A which has been premeasured for each photo-taking lens used, in connection with the fully open aperture value F of the photo-taking lens. The memory 12 stores therein the defocus amount conversion factor $1/\theta$ as shown in FIG. 2, in connection with the fully open aperture value F of the photo-taking lens.

A pair of photoelectric element arrays 7A and 7B each comprising an image sensor such as CCD are juxtaposed in a photoelectric converting unit 13. The image of the same object to be photographed is formed on each photoelectric element array by the focus detecting optical system of FIG. 1. The image output a1 . . . aN from the array 7A is time-serially A/D-converted by an A/D converter 14 and stored in data memory means 16 within a microcomputer 15, and likewise, the image output b1 . . . bN from the array 7B is stored in the data memory means 16 through the A/D converter 14. Image displacement operation means 17 calculates the amount of relative displacement of the two image outputs, i.e., the amount of relative displacement of the optical images on the pair of arrays, on the basis of said pair of image outputs a1 . . . aN and b1 . . . bN. Of course, the data used for the image displacement operation need not always be the direct image outputs of the arrays 7A and 7B, but may be image outputs obtained by suitably filtering or sampling these outputs.

Image displacement correction means 18 corrects the output of the image displacement operation means 17 by the content of the correction data memory 11 for amount of image displacement in accordance with the fully open aperture value of the photo-taking lens used. Defocus amount conversion means 19 converts the output of the image displacement correction means 18 into a defocus amount by the content of the defocus amount conversion factor memory 12 in accordance with said aperture value. The fully open aperture value of the photo-taking lens used is automatically or manually input to the fully open aperture value input means 20 in response to the mounting operation of the photo-taking lens. Display and driving means 21 displays the focus adjusted state on the basis of the defocus amount and drives the photo-taking lens to its in-focus position.

The operation will be described hereinafter.

Figure 6A:
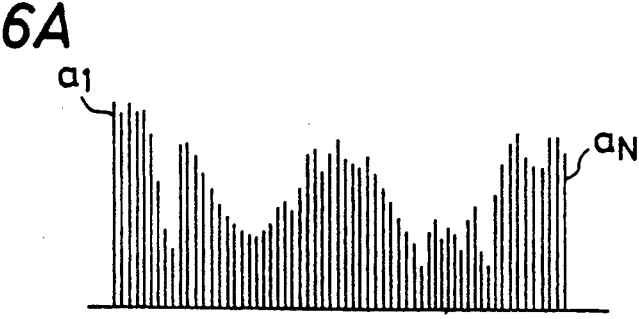
FIGS. 6A, 6B and 6C are graphs showing the image output of the photoelectric element array and the manner in which this image output is divided into a plurality of areas.
Figure 6B:
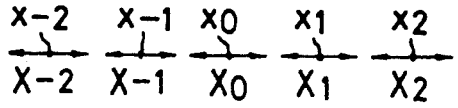
Figure 6C:
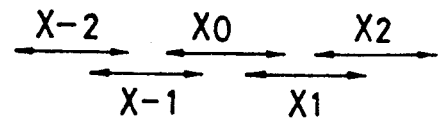

The image outputs a1 ... aN and b1 ... bN from the pair of arrays 7A and 7B are A/D-converted and then stored in the data memory means 16. The image output a1 ... aN stored in the data memory means 16 is illustrated in FIG. 6A. The image displacement operation means 17 divides this image output, for example, into five areas X-2, X-1, X0, X1 and X2 as shown in FIG. 6B or 6C, and also divides the image output b1 ... bN into five areas X-2, X-1, X0, X1 and X2, and individually operates the partial image displacement amount Z(xi) relating to the center xi of the partial area Xi, from the image output of each partial area Xi. The dividing method of FIG. 6B is an example in which the divided image outputs do not overlap one another, and the dividing method of FIG. 6C is an example in which the divided image outputs partly overlap one another. The dividing method of FIG. 6C, as compared with that of FIG. 6B, has an advantage that the number of the data in each divided image output (the data correspond, for example, to the output of the photoelectric element) can be increased. The image displacement correction means 18 reads out, from the correction data memory 11, the correction data T(Fa, x) corresponding to the fully open aperture value information Fa of the photo-taking lens used which has been input to the fully open aperture value input means 20, and calculates the partial correction amount T(Fa, xi) of the location xi from this correction data. Thereafter, the correction means 18 subtracts the partial correction amount T(Fa, xi) from the partial image displacement amount Z(xi) and obtains the corrected partial image displacement amount ZT(xi). That is, it obtains ZT(xi)=Z(xi)−T(Fa, xi).

In this manner, the correction means 18 obtains the corrected partial image displacement amount ZT(xi) relating to each partial area Xi and for example, calculates the simple average ΣZT(xi)/5 of these values as the final image displacement amount ZT. Various methods of obtaining the final image displacement amount ZT from the partial image displacement amount ZT(xi) relating to each partial area Xi would occur to mind in accordance with the purpose thereof, and some examples of those methods will be shown below.

(A1) As described above, the average value of the corrected partial image displacement amounts ZT(xi) is regarded as the final image displacement amount ZT.

(A2) The average value of the remaining corrected partial image displacement amounts except the maximum and the minimum of the corrected partial image displacement amounts ZT(xi) is regarded as the final image displacement amount ZT.

(A3) The middle one of the corrected partial image displacement amounts ZT(xi) when arranged in the order from the greater one is regarded as the final image displacement amount ZT.

(A4) The corrected partial image displacement amount ZT(xi) for the partial area (xi) in which the information amount E(x) to be described becomes the maximum is regarded as the final image displacement amount ZT.

(A5) The average value of the corrected partial image displacement amounts ZT(xi) for a plurality of partial area Xi in which said information amounts are relatively large, or the average value obtained by multiplying the corrected partial image displacement amounts ZT(xi) by the respective coefficients having magnitudes according to said information amounts and by adding the products (multiplied values) is regarded as the final image displacement amount ZT.

The defocus amount conversion means 19 reads out, from the conversion factor memory 12, the conversion factor $1/\theta$ corresponding to the fully open aperture value information Fa from the fully open aperture value input means 20, and converts the final image displacement amount ZT of the correction means 18 into a dofocus amount P by the use of this conversion factor $1/\theta$ and another conversion factor K determined by the characteristic of the focus detecting optical system. That is, $$P = K \times \frac{1}{\theta} \times ZT.$$

The display and driving means 21 is operated on the basis of this defocus amount P.

In order to effect the algorithm for calculating the partial image displacement operation from the data of each partial area Xi, it is possible to use, for example, means for Fourier-converting the image output and comparing the phase (U.S. Pat. No. 4,264,810) or means for effecting correlation operation and obtaining a shift amount which provides a maximum correlation (U.S. Pat. No. 4,333,007), and further, it is also possible to use the correlation operation method disclosed in U.S. Application Ser. No. 575,154, now U.S. Pat. No. 4,561,749, by the same assignee as the assignee of the present invention. In this last cited correlation operation method, the correlation amount C(L) when a pair of data rows A1 ... AN and B1 ... BN have been relatively shifted by a predetermined amount L is obtained from $$C(L) = \sum_{i=q}^{r} |Ai - Bi + L| \qquad (1)$$

and when $C(L) \leq C(L-1)$ and $C(L) < \underline{C(L+1)}$ are satisfied, the following values DL, E, $\overline{Cext}$ and Lm are obtained:

$$DL = \{C(L-1) - C(L+1)\} \times \tfrac{1}{2} \qquad (2)$$

$$E = \mathrm{Max}\{C(L+1) - C(L), C(L-1) - C(L)\} \qquad (3)$$

where Max{Ca, Cb} means selecting the greater one of Ca and Cb.

$$\overline{Cext} = C(L) - |DL| \qquad (4')$$

$$\overline{Cext} = \{C(L) - |DL|\}/E \qquad (4)$$

$$Lm = L + DL/E \qquad (5)$$

When the range of the data Ai and Bi used for calculating the correlation amount C(L) is operated being regarded as said each partial area Xi, said Lm becomes the partial image displacement amount Z(xi). When the number of the photoelectric elements included in the partial area Xi is small, the use of said Fourier conversion method would result in higher accuracy.

Where a deep object to be photographed is imaged on the array, if the image displacement amount is calculated by the use of the image output of the entire area of the array, to which portion of the object of large depth the photo-taking lens is automatically focused will be entirely unclear.

The problem regarding such a deep object to be photographed can be solved as follows by operating the partial image displacement amount $Z(x_i)$ for each partial area $X_i$:

(B1) If the smallest image displacement amount is selected from among a plurality of partial image displacement amounts $Z(x_i)$ and the final image displacement amount ZT is obtained on the basis thereof, the defocus amount regarding the nearest portion of the deep object to be photographed can be obtained and conversely, by the selection of the greatest partial image displacement amount, the defocus amount regarding the distant portion can be obtained, and further, by the selection of the medium partial image displacement amount, the defocus amount regarding the portion of medium distance can be obtained.

(B2) If some of a plurality of partial image displacement amounts $Z(x_i)$ assume a substantially equal value, if that value is selected and the final image displacement amount ZT is obtained on the basis thereof, there can be obtained the defocus amount regarding an object to be photographed which occupies a relatively wide area.

(B3) If the partial image displacement amount in the partial area $X_i$ in which the information amount $E(x_i)$ to be described is greatest is selected and the final image displacement amount ZT is obtained on the basis thereof, there can be obtained the defocus amount regarding an object to be photographed having the most information for focus detection, generally, an object to be photographed having the best contrast.

A specific example of the case where the partial image displacement amount is calculated as described above will now be described by the use of a flow chart.

Figure 7:
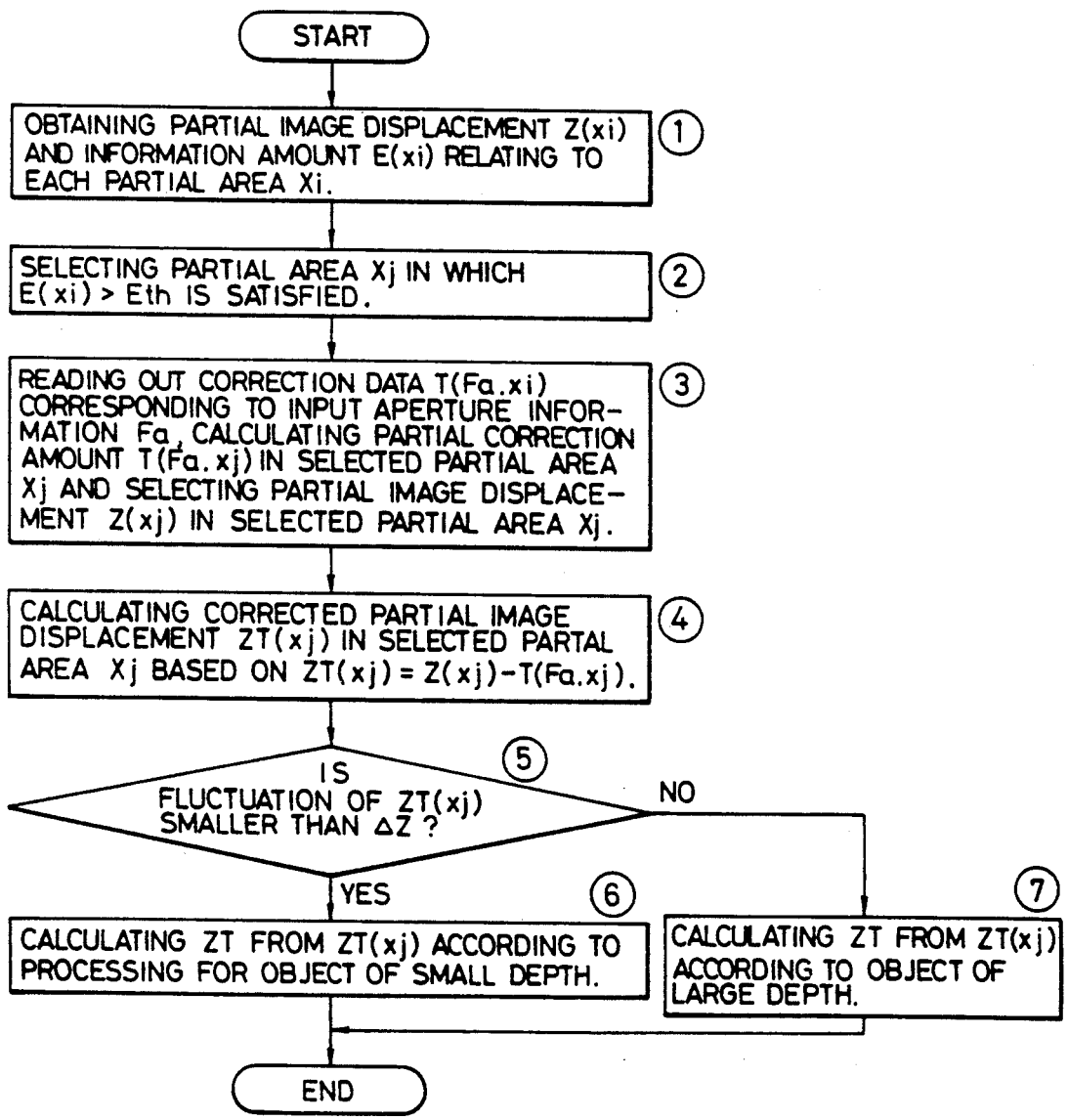
FIG. 7 is a flow chart showing part of the operation of an embodiment.

In FIG. 7, at step ①, the partial image displacement amount $Z(x_i)$ and information amount $E(x_i)$ relating to each partial area $X_i$ are calculated by the image displacement operation means 17. The information amount $E(x_i)$ represents the degree of reliability of the corresponding partial image displacement amount $Z(x_i)$ and the greater is the value of this information amount, the higher is the accuracy of the corresponding partial image displacement amount. More specifically, if image displacement operation is effected by the phase comparison after Fourier conversion, the value related to the amplitude after Fourier conversion (for example, the information amounts r1, r1', r2 and r2' shown in U.S. Pat. No. 4,336,450 correspond thereto) can be used as the information amount, and where the image displacement operation is the correlation method described in the aforementioned U.S. Pat. No. 4,333,007 or U.S. Application Ser. No. 575,154, now U.S. Pat. No. 4,561,749, a self-correlated value Wm to be described can be used, and particularly in the case of U.S. Pat. No. 4,333,007, the value Dm shown therein can be used, and where the image displacement operation is the correlation operation of U.S. Application Ser. No. 575,154, E of the aforementioned equation (3) can also be used. At step ②, the information amount $E(x_i)$ of each partial area $X_i$ is compared with a predetermined threshold value Eth and a partial area $X_j$ having an information amount $E(x_j)$ of a value greater than this threshold value is selected. At step ③, a correction data $T(Fa, x)$ corresponding to the aperture value information Fa input to the fully open aperture value input means 20 is read out from the correction data memory 11, and the partial correction amount $T(Fa, x_j)$ for the selected partial area $X_j$ is calculated therefrom and the partial image displacement amount $Z(x_j)$ for the selected partial area $X_j$ is selected from among the partial image displacement amounts $Z(x_i)$. At step ④, the corrected partial image displacement amount $ZT(x_j)$ relating to the selected area $X_j$ is calculated from $ZT(x_j) = Z(x_j) - T(Fa, x_j)$. At step ⑤, whether the fluctuation of the corrected partial image displacement amounts $ZT(x_j)$ obtained at step ④ is smaller than a predetermined value $\Delta Z$, and more specifically, whether the difference between the maximum value and the minimum value of the corrected partial image displacement amounts $ZT(x_j)$ is smaller than a predetermined value $\Delta Z$ is discriminated and, when it is smaller than the predetermined value, the object to be photographed is judged as having no depth and the program shifts to step ⑥, and when it is not smaller than the predetermined value, the object to be photographed is judged as being deep and the program shifts to step ⑦. At step ⑥, the final image displacement amount ZT is calculated, for example, by any one of the aforementioned processes (A1) to (A5). At step ⑦, the final image displacement amount ZT is calculated, for example, by any one of the aforementioned processes (B1) to (B3).

Figure 8:
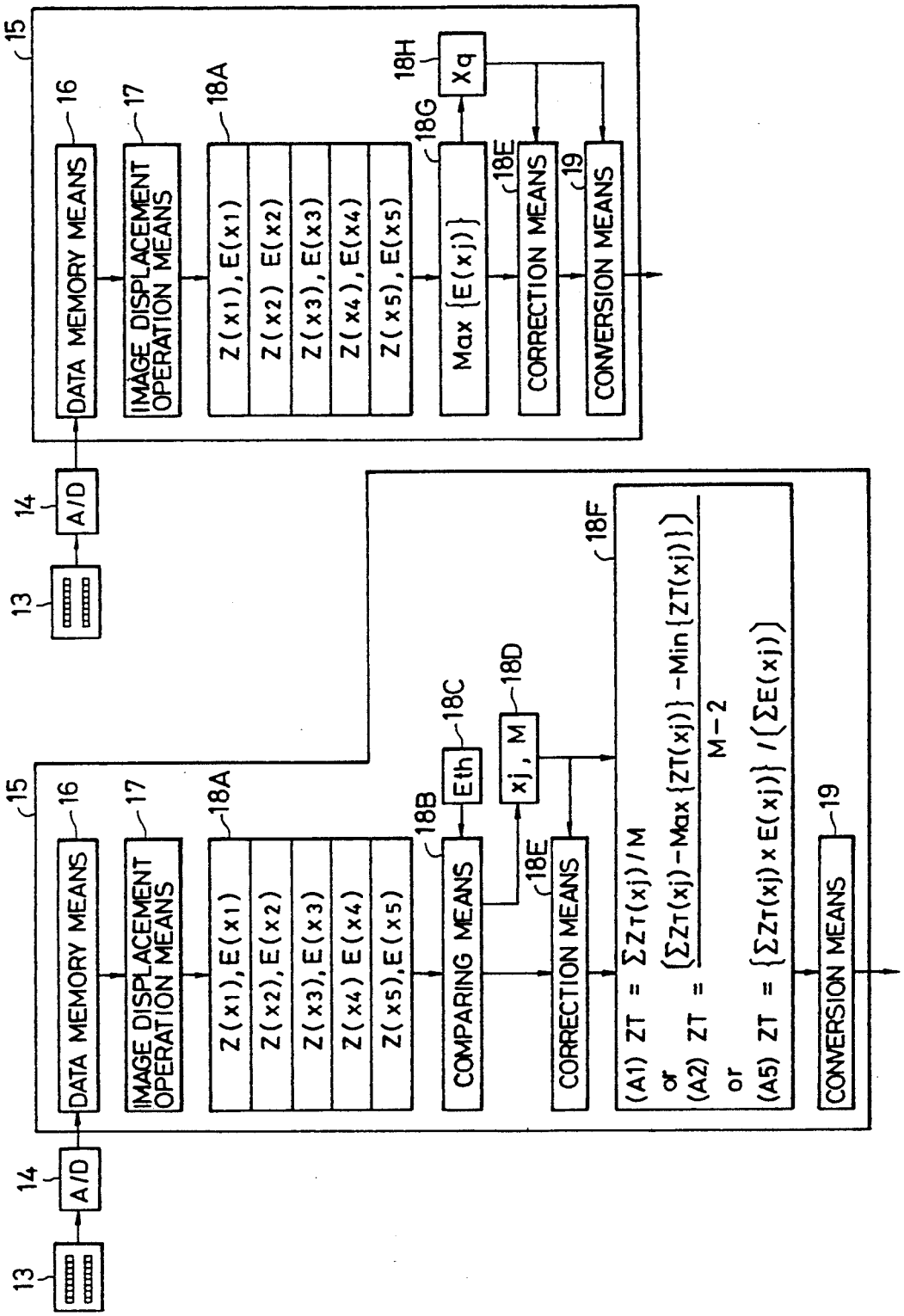
FIGS. 8A, 8B and 9 are block diagrams showing the specific constructions of image displacement amount correction means.

FIG. 8A shows a specific example of the operation of the image displacement correction means 18 of FIG. 5 in a detailed block diagram. The image displacement amounts $Z(x_1)$, $Z(x_2)$, $Z(x_3)$, $Z(x_4)$ and $Z(x_5)$ and the information amounts $E(x_1)$, $E(x_2)$, $E(x_3)$, $E(x_4)$ and $E(x_5)$ relating to five areas $X_i$ operated by the image displacement operation means 17 are stored in a memory 18A. Comparing means 18B compares each of the information amounts $E(x_1) - E(x_5)$ with the predetermined value Eth in a memory 18C and causes a memory 18D to store therein the partial areas $X_j$ relating to the information amount greater than said predetermined value and the number M of such areas. Correction means 18E receives as input the selected partial areas $X_j$ from a memory 18D, whereby it calculates the partial correction amount $T(Fa, x_j)$ from the correction data $T(Fa, x)$ and calculates the corrected partial image displacement amounts $ZT(x_j)$ relating to the selected partial areas $X_j$. Statistics processing means 18F effects statistics processes (A1), (A2) or (A5) from these image displacement amounts $ZT(x_j)$, the number M and the information amount $E(x_j)$ and obtains the final image displacement amount ZT.

FIG. 8B shows an example in which the aforementioned process (A4) is effected. Maximum value detecting means 18G detects the maximum value of the information amounts $E(x_1) - E(x_5)$ and causes a memory 18H to store therein a partial area $X_q$ which provides this maximum value. Correction means 18E corrects the partial image displacement amount $Z(x_q)$ regarding this area $X_q$.

Figure 9:
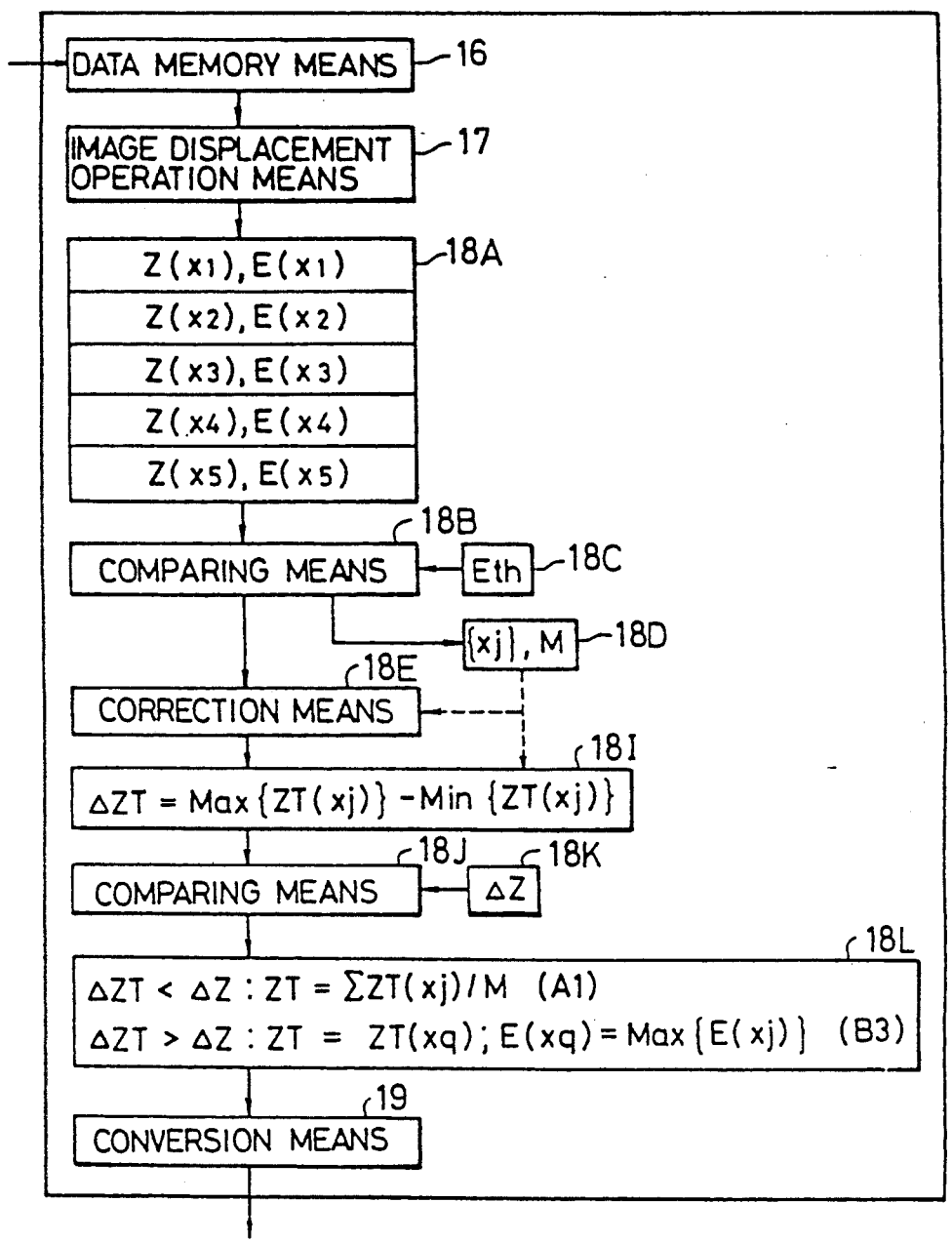

FIG. 9 is a block diagram of the steps ⑤, ⑥ and ⑦ of FIG. 7. In FIG. 9, blocks 18A–18E are entirely identical to those of FIG. 8A. Subtraction means 18I finds the maximum and the minimum of the corrected partial image displacement amount $ZT(x_j)$, and then calculates the difference $\Delta ZT$ between the two. Comparing means 18J compares this difference $\Delta ZT$ with a predetermined value $\Delta Z$ in a memory 18K. Statistics processing means 18L judges the object to be photographed as having no depth when $\Delta ZT < \Delta Z$ and calculates the final image displacement amount ZT by the process (A1), and judges the object to be photographed as being deep when $\Delta ZT \geq \Delta Z$ and regards as the final image displacement amount the corrected image displacement amount ZT(xq) corresponding to the maximum E(xq) of the information amounts $E(x_1) - E(x_5)$, process (B3) for example.

The above-described embodiment is an example in which a plurality of partial image displacement amounts are calculated from a pair of image outputs, and a second embodiment in which a single image displacement amount is calculated will now be described.

Figure 10A:
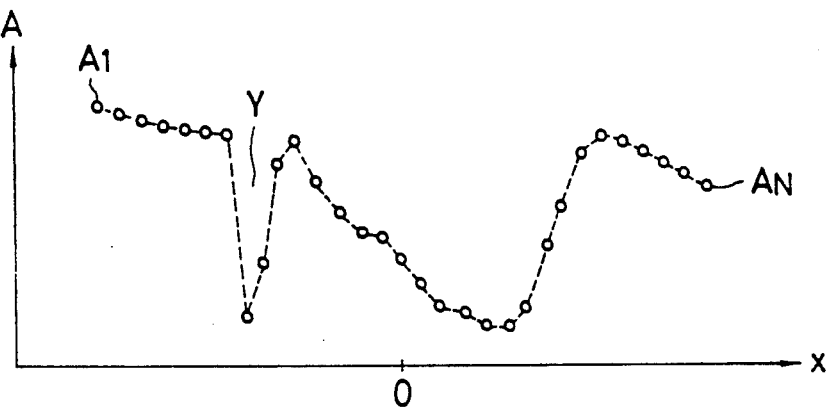
FIGS. 10A and 10B are graphs showing the image output and the sharpness of the variation in the image output, respectively.

FIG. 10A shows one of a pair of data trains A1 ... AN and B1 ... BN stored in the data memory means 16 of FIG. 5. The data trains may be the image outputs of the photoelectric element arrays or the image outputs subjected to filtering or sampling, as previously mentioned.

In FIG. 5, the image displacement operation means 17 uses a pair of data trains A1 ... AN and B1 ... BN stored in the data memory means 16 and obtains the correlation amount C(L) for each shift amount L which shifting one data train A1 ... AN by predetermined amounts L relative to the other data train B1 ... BN.

That is, $C(L) = \sum_{i=q}^{r} |A_i - B_i + L|$

The shift amount Lm for which this function C(L) is smallest is obtained as the image displacement amount. The image displacement amount Lm obtained by the correlation operation includes an error attributable to the position displacement by the vignetting as described above and therefore, this image displacement amount Lm must be corrected by the correction data T(Fa, x) relating to the aperture value of the photo-taking lens used. However, this image displacement amount is calculated from the entire area of the data trains A1 ... AN and B1 ... BN and therefore, a problem arises as to which area of the correction data T(Fa, x) as the correction amount.

This problem is solved in the following manner.

Not all portions of the data trains A1 ... AN and B1 ... BN equally contribute to said correlation amount C(L), but as shown in FIG. 10A, a portion Y in which a sharp variation in the data train occurs contributes greatly and portions in which gentle variation occurs contributes less. Accordingly, the degree of said contribution for each location x of the data trains A1 ... AN and B1 ... BN (hereinafter referred to as the degree of contribution) may be obtained and the correction amount may be obtained from the degree of contribution corresponding to the location and the correction data T(Fa, x). This degree of contribution Wm can be calculated, for example, from the difference between adjacent data of the data trains.

Figure 10B:
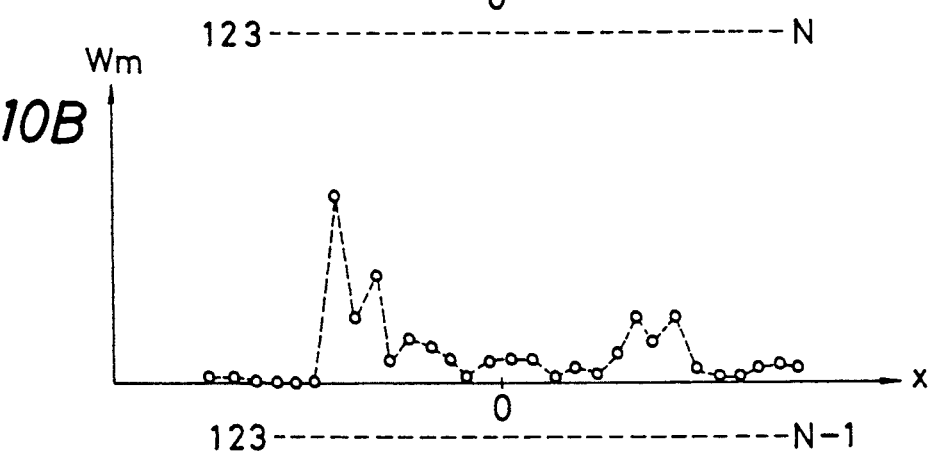

That is, $Wm = |Am - Am+1|$ or $|Bm - Bm+1|$. This value Wm is shown in FIG. 10B.

Of course, $|Am - Am+1| + |Bm - Bm+1|$ can also be used as Wm.

The correction amount St is $ST = \Sigma Sm \cdot Wm / \Sigma Wm,$ where Sm is T(Fa, x) when x = m. Accordingly, the corrected image displacement amount ZT can be found from the following equation:

$ZT = Lm - ST$

Also, the final image displacement amount ZT can be determined as follows. Said Wm is calculated from the image output A1 ... AN or B1 ... BN stored in the data memory means 16, and data AP or BP which provides the maximum of Wm over the entire area of the image output is obtained. When the position of this data AP or BP on the coordinates axis x of FIG. 6B is xp, a predetermined range area Xp about the position xp is determined and a partial image displacement amount Z(xp) is calculated relative to the image output in this area. This is corrected by the correction amount T(Fa, xp) at said position and regarded as the final image displacement amount ZT.

That is, $ZT = Z(xp) - T(Fa, xp)$.

Figure 12:
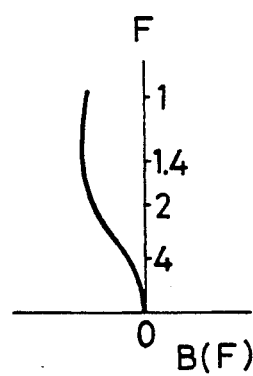
FIG. 12 is a graph showing the relation between the position of the best imaging plane and the aperture value of the photo-taking lens.
Figure 11:
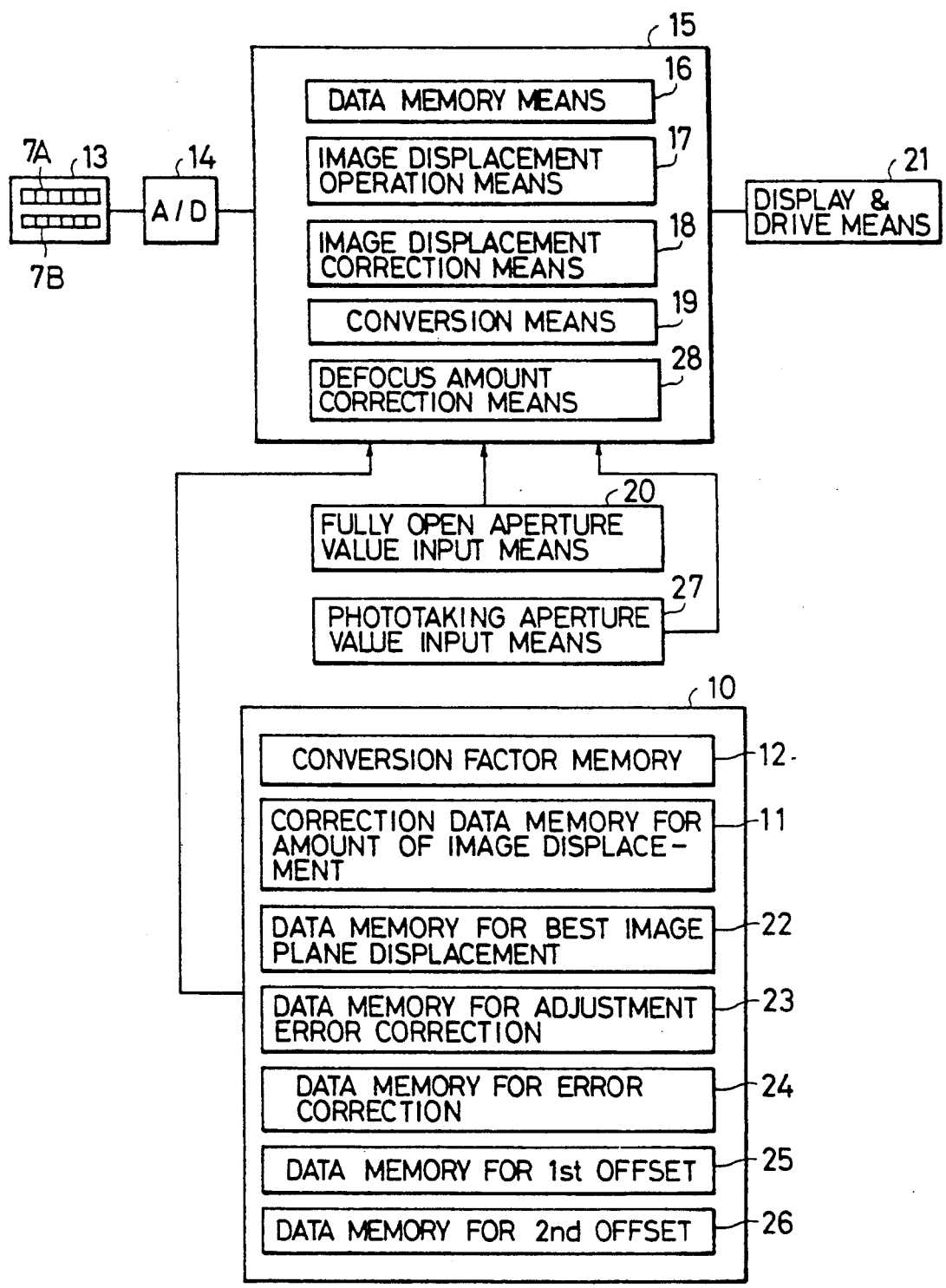
FIG. 11 is a block diagram showing an improved example of the above embodiment.

FIG. 11 shows an improved example of the FIG. 5 arrangement. Within correction data memory means 10, in addition to a correction data memory 11 for amount of image displacement and a defocus amount conversion factor memory 12, there are provided a data memory 22 for best image plane displacement, a data memory 23 for adjustment error correction, a data memory 24 for error correction, a data memory 25 for first offset and a data memory 26 for second offset. The data memory 22 for best image plane displacement serves to store therein a function $\beta(F)$ shown in FIG. 12, and this function $\beta(F)$ represents the amount of displacement of the best imaging plane of the object to be photographed in the direction of the optic axis when the aperture of the photo-taking lens is stopped down. The data memory 23 for adjustment error correction stores therein the remaining superposition error as a function U(x) after the adjustment of superposing on the focus detecting area 4 the images of the photoelectric element arrays 7A and 7B by the concave mirrors 6A and 6B of FIG. 1.

Figure 4B:
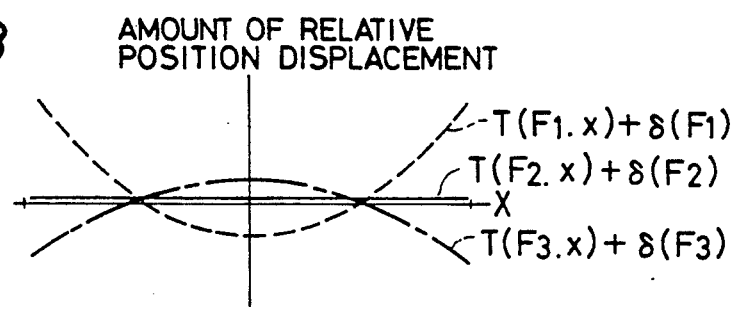

Also, the data memory 24 for error correction stores therein a function $\delta(F)$ shown in FIG. 4B. The correction data memory 11 for amount of image displacement stores therein a function T(F, x) shown in FIG. 4A in connection with the aperture value of the photo-taking lens on the premise that predetermined adjustment has been effected with regard to the focus detecting optical system 3. However, when the focus detecting device is to be assembled, it is difficult to completely effect said predetermined adjustment with regard to individual focus detecting optical systems and generally as shown, for example, in FIG. 4B, there is much possibility of an error of the function $\delta(F)$ occurring in optical adjustment. This function $\delta(F)$ is usually a value different for each individual focus detecting optical system and is stored in connection with the aperture value of the photo-taking lens. The data memory 25 for first offset is for correcting a slight error of the defocus amount caused by insufficient mechanical adjustment after the focus detecting device has been incorporated into a camera body and the mechanical adjustment between the camera and the focus detecting device has been completed, and the correction amount $\Delta Z1$ thereof also is a value different for each individual camera. The data memory 26 for second offset stores therein a variable correction amount $\Delta Z2$ to enable the focus adjusted state to be finely adjusted in accordance with the photographer's liking, and this correction amount can be set by an extraneous operating member, not shown.

The preset aperture value of the photo-taking lens namely, the aperture value to which the aperture is stopped down during photography is input to an aperture value input means 27. Defocus amount correction means 28 is provided in a microcomputer 15, and it corrects the defocus amount, which is the output of conversion means 19 by the output of the data memory 22 for best image plane displacement and the outputs of the data memory 25 and the data memory 26 and delivers it to display and driving means 21.

The operation will now be described.

The correction amounts T(Fa, x) and δ(Fa) corresponding to the fully open aperture value information Fa input to the fully open aperture value input means 20 are read out from the correction data memory 11 for amount of image displacement and the data memory 23 for error correction, respectively. The correction amount U(x) is read from the data memory 23 for adjustment error correction. The image displacement correction means 18 corrects the image displacement amount Z(x) from the image displacement operation means by the correction amounts T(Fa, x), δ(x) and U(x) and calculates the final image displacement amount ZT. The calculation of this final image displacement amount ZT is carried out by the various operations described with respect to FIG. 5. The defocus amount conversion means 19 converts the final image displacement amount ZT into a defocus amount by the use of the conversion factor $1/\theta$ read out from the conversion factor memory 12 and another conversion factor K in accordance with the fully open aperture value Fa. The defocus amount correction means 28 calculates the best image plane displacement amount $\Delta\beta$ between the best image plane at the aperture value during phototaking and the best image plane at the aperture value during focus detection by the use of the output $\beta(F)$ of the data memory 22 for best image plane displacement, corrects the output of the conversion means 19 by the best image plane displacement amount $\Delta\beta$, the output $\Delta Z1$ of the data memory 25 for first offset and the output $\Delta Z2$ of the data memory 26 for second offset, and puts out the final defocus amount P.

Where the position displacement amount corresponding to a location between the relative position of the first photoelectric element array and the optical image thereon and the relative position of the second photoelectric element array and the optical image thereon is remarkably great, it is sometimes difficult to correct the image displacement amount by the correction data at high accuracy. Therefore, it is desirable to vary the pitch of the photoelectric elements of the first and second photoelectric element arrays in accordance with the locations thereof, to thereby pre-correct said position displacement amount to a certain degree and store the remaining position displacement amount as the correction data.

When the position of the exit pupil of the photo-taking lens and the position of the set pupil of the focus detecting optical system are not coincident with each other in the direction of the optic axis, the vignetting of the focus detecting light beam imparts another adverse effect to focus detection. This adverse effect will hereinafter be described.

Referring to FIG. 13A, a plurality of small lenses 31, 32 and 33 are linearly arranged on the back of a field lens 30 disposed rearwardly of a photo-taking lens 1. The small lenses 31 and 33 are positioned at the opposite ends of the small lens row, and the small lens 32 is positioned at the center of the small lens row. The small lens row is determined so as to be substantially coincident with the focal plane of the photo-taking lens 1. Pairs of photo-electric elements 34a and 34b, 35a and 35b, and 36a and 36b are disposed immediately behind the small lenses 31, 32 and 33, respectively, and of these pairs of photoelectric elements, the lower photoelectric elements 34a, 35a and 36a together constitute a first photoelectric element array and the upper photoelectric elements 34b, 35b and 36b together constitute a second photoelectric element array. The first and second photoelectric element arrays correspond to the pair of photoelectric element arrays 7A and 7B, respectively, of FIG. 1. By the small lens row and the field lens, the photoelectric elements 34a, 35a and 36a of the first array are imaged so as to be overlapped on an area 110A and likewise, the photoelectric elements 34b, 35b and 36b of the second array are imaged so as to be overlapped on an area 110B. These areas 110A and 110B are the set pupils of the focus detecting optical system and correspond to the set pupils 100A and 100B, respectively, of FIG. 1.

Figure 15A:
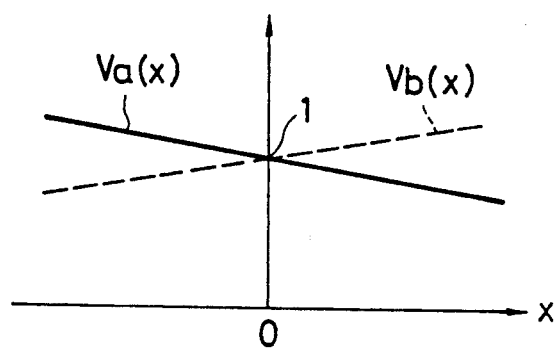
FIGS. 15A, 15B and 15C are graphs showing the vignetting characteristic, the brightness distribution of an object to be photographed, and the photoelectric output pattern when subjected to the influence of vignetting, respectively.
Figure 15B:
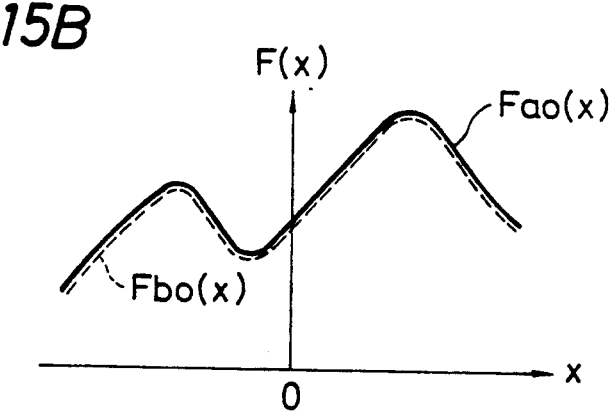
Figure 15C:
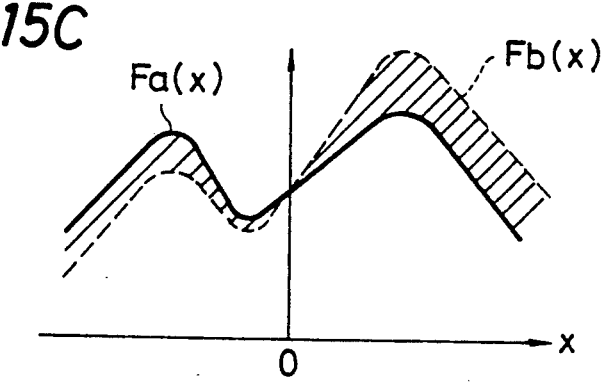

If the positions of the set pupils in the direction of the optic axis and the position of the exit pupil of the phototaking lens in the same direction are coincident with each other as in the case of FIG. 1, even if the focus detecting light beam is vignetted by the photo-taking lens, this vignetting equally acts on all of the photoelectric elements and therefore, the intensities of illumination of the photoelectric elements are only reduced uniformly. Accordingly, this reduction in intensity of illumination does not much adversely affect focus detection. However, where the positions 110A and 110B of the set pupils and the position 111 of the exit pupil of the photo-taking lens are not coincident with each other as shown in FIG. 13A, if the focus detecting light beam is vignetted by the photo-taking lens 1, the intensities of illumination on the photoelectric elements will be reduced differently in accordance with the locations of the photoelectric element arrays as will hereinafter be described in detail, and this will result in a great reduction in focus detection accuracy. More particularly, when the exit pupil 111 is more distant from the small lens row 31, 32, 33 than the set pupils 110A and 110B, as shown in FIG. 13A, the focus detecting light beam 112 is distributed uniformly on the central pair of photoelectric elements 35a, 35b as shown in FIG. 14A, but is distributed non-uniformly on the other pairs of photoelectric elements. If the positional relation between the exit pupil 111 and the set pupils 110A, 110B is opposite to that shown in FIG. 13A, the relation between the focus detecting light beam and the pairs of photo-electric elements will be such as shown in FIG. 14B. In FIGS. 14A and 14B, the hatching and the distribution of numerous dots indicate the focus detecting light beam incident on the photoelectric elements 34b, 35b, 36b and the light beam incident on the elements 34a, 35a, 36a, respectively. The photoelectric output pattern of the first array 34a, 35a, 36a of FIG. 14A and the photoelectric output pattern of the second array 34b, 35b, 36b are inclined in opposite directions as indicated by solid line Va(x) and broken line Vb(x), respectively, in FIG. 15A when the brightness of the object to be photographed is uniform. Assuming that the brightness distribution of any object to be photographed is the pattern indicated by solid line in FIG. 15B, the relative displacement amount of the two photoelectric output patterns is obtained, for example, by the operations of the aforementioned equations (1)-(5) on the basis of the photoelectric output of the first array and the photoelectric output of the second array and, when the two photoelectric output patterns are displaced relative to each other by this displacement amount, if there is no vignetting of the focus detecting light beam, the photoelectric output pattern Fao(x) of the first array and the photoelectric output pattern Fbo(x) of the second array will be substantially completely coincident with each other as shown in FIG. 15B. By the vignetting characteristics Va(x) and Vb(x) of FIG. 15A, the photoelectric output patterns Fao(x) and Fbo(x) of FIG. 15B become the pattern Fa(x) indicated by solid line in FIG. 15C and the pattern Fb(x) indicated by broken line in FIG. 15C, respectively, and the two curves become incoincident with each other and as a result, it becomes very difficult to detect the displacement amount of the object images on the first and second arrays. In FIGS. 15A, 15B and 15C, the series of photoelectric outputs of the photoelectric element arrays are dispersive and therefore, the curves Va(x), Vb(x), Fao(x), Fbo(x), Fa(x) and Fb(x) should be dispersively plotted, but for simplicity, they are indicated by continuous curves.

An embodiment of the present invention which eliminates the focus detection error resulting from such vignetting will now be described by reference to FIG. 16.

Figure 16:
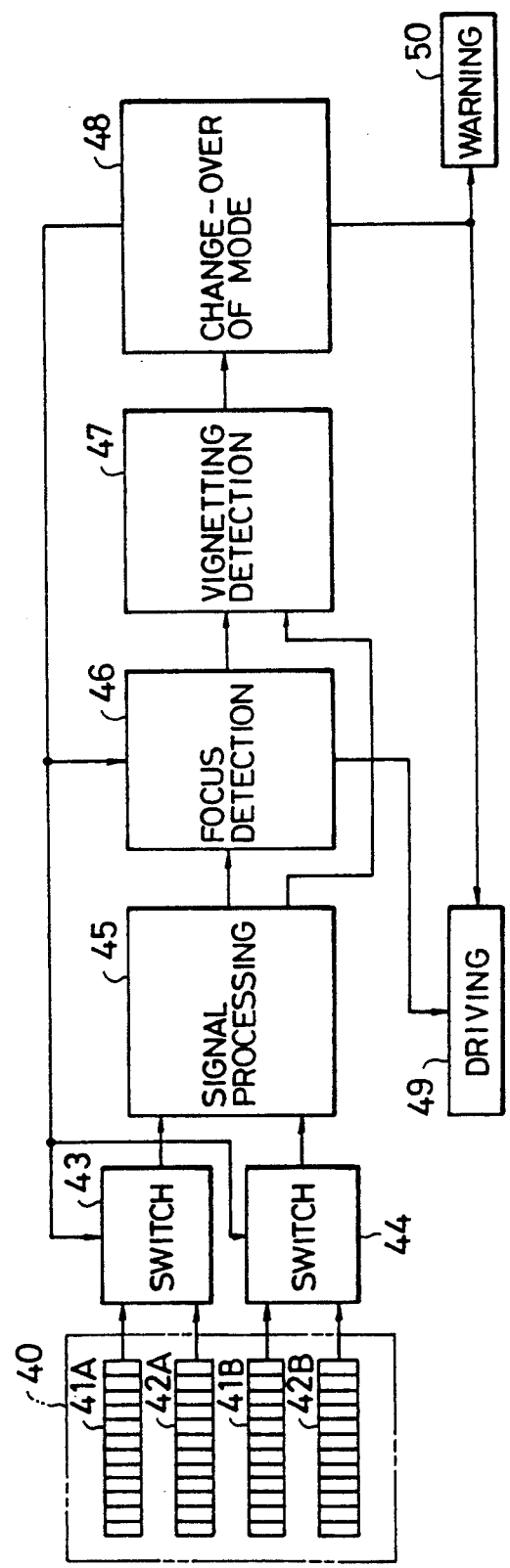
FIG. 16 is a block diagram showing another embodiment of the present invention.

In FIG. 16, a photoelectric converting unit 40 for photoelectrically converting the object image by the focus detecting optical system as shown in FIG. 1 or 13 has two pairs of photoelectric element arrays 41A, 41B and 42A, 42B. One pair of photoelectric element arrays 41A, 41B and the other pair of photo-electric element arrays 42A, 42B are such that the size of the light-receiving portion of each photoelectric element of the former pair is larger than the size of the light-receiving portion of each photoelectric element of the latter pair and the set pupil positions of the two pairs are identical, but the size of the set pupil of the former pair is larger than the size of the set pupil of the latter pair. Accordingly, the pair of arrays 42A, 42B decrease in quantity of light received as compared with the pair of arrays 41A, 41B, but the pair of arrays 42A, 42B less suffers the vignetting by the photo-taking lens than the pair 41A, 41B. That is, when a photo-taking lens of certain aperture value is used, there may occur a situation that the focus detecting light beam entering the pair of arrays 41A, 41B is vignetted, but the focus detecting light beam entering the pair of arrays 42A, 42B is not vignetted.

Switch means 43 alternatively selects the outputs of the photoelectric element array 41A or 42A and likewise, switch means 44 alternatively selects the output of the photoelectric element array 41B or 42B, and these two switch means 43 and 44 are interlocked together so that the pair of arrays 41A, 41B are selected together and the pair of arrays 42A, 42B are selected together Signal processing means 45 effects processing such as amplification or filtering of the signals from the switch means 43 and 44. Focus detection means 46 calculates the image displacement amount from the outputs of the pairs of arrays passed through the signal processing means 45, converts it into a defocus amount and puts out the same. Vignetting detection means 47 which will later be described in detail receives the output signals of the pairs of arrays from the signal processing means 45 and detects the degree of vignetting of the focus detecting light beam. Mode change-over means 48 compares the output of the vignetting detection means 47 with a predetermined value and, when the degree of vignetting is small, it produces a normal mode signal and, when the degree of vignetting is great, it produces a vignetting mode signal. Driving means 49 drives the photo-taking lens to its in-focus position in response to the defocus signal when the normal mode signal is produced. Warning means 50 warns that focus detection is impossible due to vignetting.

The operation will now be described.

Each array 41A, 41B, 42A, 42B time-serially produces a series of photoelectric outputs representative of the illumination intensity pattern of the object image on itself at a predetermined time interval. Switch means 43 and 44 normally select the pair of photoelectric element arrays 41A, 41B comprising photoelectric elements having large light-receiving areas. Focus detection means 46 calculates the image displacement amount from the output signals of the pair of arrays 41A, 41B passed through the signal processing means 45, and converts it into a defocus amount. The vignetting detection means 47 detects the degree of vignetting on the basis of the outputs of the pair of arrays 41A, 41B. The mode change-over means 48 produces a normal mode signal when it judges that the output of the means 47 is small. At this time, the driving means 49 drives the photo-taking lens to its in-focus position in response to the defocus signal of the means 46. The above-described operation is repeated during the time that the normal mode signal is produced.

The mode change-over means 48 produces a vignetting mode signal when it judges that the output of the means 47 is great, and this vignetting mode signal decelerates or stops the driving of the photo-taking lens by the driving means 49 and causes the switch means 43 and 44 to select the pair of arrays 42A, 42B. Thus, the focus detection means 46 detects the image displacement amount on the basis of the output signals of the pair of arrays 42A, 42B, and converts it into a defocus amount by a conversion factor selected in accordance with the vignetting mode signal. Also, the vignetting detection means 47 detects the degree of vignetting. The mode change-over means 48 produces a normal mode signal when it judges that the degree of vignetting is small, and thus the driving means 49 drives the photo-taking lens in response to the then defocus signal. The above-described operation is repeated during the time that this normal mode signal is produced.

A vignetting mode signal is produced when the mode change-over 48 judges that the degree of vignetting is great in spite of the pair of arrays 42A, 42B being selected, and thereby the driving of the photo-taking lens is decelerated or stopped. The warning means 50 warns and displays that focus detection is impossible by the then photo-taking lens, in response to the vignetting mode signal when the pair of arrays 42A, 42B are selected.

Specific examples of the vignetting detection means and mode change-over means will now be described.

Figure 17A:
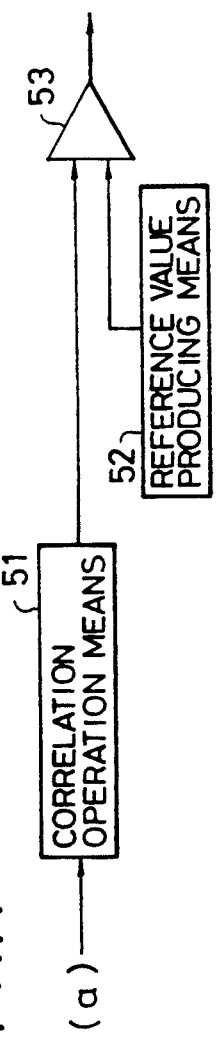
FIGS. 17A, 17B and 17C are block diagrams showing specific examples of the construction of the vignetting detection means and mode detection means of FIG. 16.

The value "Cext" of equation (4') represents the area of the region indicated by hatching in FIG. 15C, and this properly reflects the degree of vignetting and accordingly becomes great in accordance with the degree of vignetting. Thus, as shown in FIG. 17A, the operation of the aforementioned equations (1)-(4') is effected by correlation operation means 51 which receives the output signals of the pair of arrays 41A, 41B or 42A, 42B, and the value "Cext" is found. This value is compared with the reference value output of reference value producing means 52 by comparing means 53. The comparing means 53 produces a mode change-over signal when the former is greater than the latter, and produces a normal mode signal when the former is smaller than the latter. The correlation operation means 51 constitutes the vignetting detection means 47, and the reference value producing means 52 and the comparing means 53 together constitute the mode change-over means 48. Also, since the correlation amount C(L) differs greatly depending on the object to be photographed, the value "Cext" may be normalized. For example, Cext/Cmax obtained by dividing "Cext" by a maximum correlation amount Cmax or the $\overline{Cext}$ of equation (4) may be used instead of Cext.

If the focus detection means 46 of FIG. 16 is one which effects the operation of equations (1)–(5) and calculates the image displacement amount Lm, the result "Cext" or $\overline{Cext}$ of the operation of this focus detection means 46 can be intactly utilized for the detection of vignetting and therefore, the vignetting detection means 47 can be eliminated.

Another specific example of the construction of the vignetting detection means and mode changeover means will now be described.

Figure 17B:
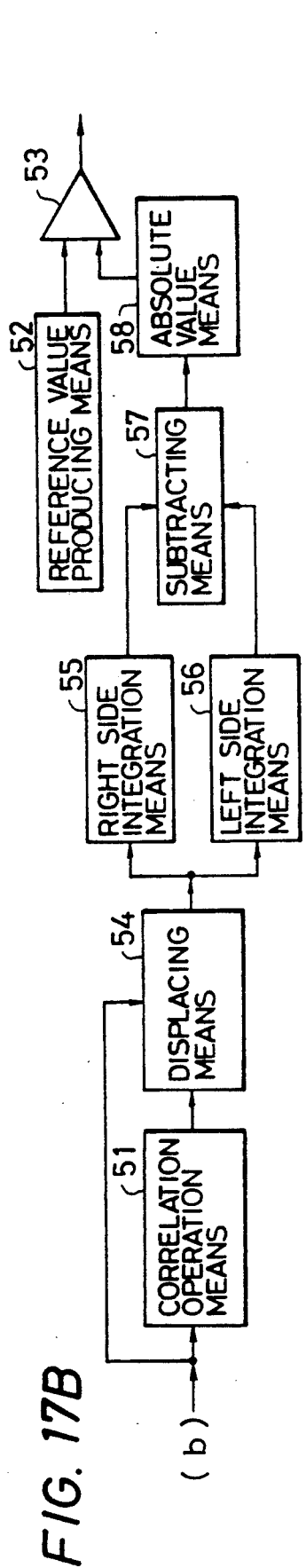

As shown in FIG. 15C, the photoelectric output pattern Fa(x) of the first array and the photoelectric output pattern Fb(x) of the second array, even if made coincident with each other in the direction x, are not coincident with each other in magnitude due to the vignetting characteristics Va(x) and Vb(x) of FIG. 15A, and on the right side with the center of the pattern, i.e., x=0, as the boundary, one pattern is larger than the other pattern and, on the left side, one pattern is smaller than the other pattern, and a difference as indicated by hatching occurs between the sizes of the two patterns Fa(x) and Fb(x). The magnitude of the area of this hatching portion depends on the degree of vignetting and therefore, by finding this area, the degree of vignetting can be detected. FIG. 17B shows an example in which this area is found, and the correlation operation means 51 finds the relative displacement amount Lm of the two photoelectric output patterns on the basis of the photoelectric outputs of the first and second arrays. Displacing means 54 displaces the photoelectric output pattern Fa(x) of the first array relative to the photoelectric output pattern Fb(x) of the second array by said displacement amount Lm in the direction x and makes the two patterns Fa(x) and Fb(x) coincident with each other in the direction x, as shown in FIG. 15C. Right side integration means 55 and left side integration means 56 receive as inputs the photoelectric outputs of the first and second arrays in which the relative displacement amount has thus become zero, and the right side and left side integration means 55 and 56 integrate Fa(x)−Fb(x) with respect to a certain area on the right side of FIG. 15C and a certain area on the left side of FIG. 15C, respectively. As described above, the patterns Fa(x) and Fb(x) are opposite in magnitude on the right side and the left side and therefore, the outputs of the right side and left side integration means are opposite in sign.

Subtracting means 57 finds the difference between the outputs of the two integration means 55 and 56, and absolute value means 58 finds the absolute value of the output of the means 57. Accordingly, the output of the absolute value means 58 represents the total area of a part of the right side hatching portion of FIG. 15C and a part of the left side hatching portion of FIG. 15C and thus, the degree of vignetting. Comparing means 53 compares this absolute value output with a reference value and makes a normal mode signal or a vignetting mode signal.

The integration ranges of the integration means 55 and 56 may be the entire right side range and the entire left side range, respectively, of the center x=0 of FIG. 15C, or may be only the small areas greatly spaced apart to the right and left from the center at which the influence of vignetting is great.

Another specific example of the construction of the vignetting detection means and mode change-over means will now be described.

Functions Va(x) and Vb(x) representing the vignetting shown in FIG. 15A can be expressed by the following equations:

$$Va(x) = 1 + \beta x$$

$$Vb(x) = 1 - \beta x$$

The factor $\beta$ showing the slope of Va(x) and Vb(x) corresponds to the degree of vignetting. This factor $\beta$ can be calculated as follows.

The pair of photoelectric output patterns Fa(x) and Fb(x) of FIG. 15C can be expressed as follows from the above-mentioned vignetting functions Va(x) and Vb(x) and functions Fao(x) and Fbo(x) representative of the object brightness.

$$Fa(x) = Fao(x) \times (1 + \beta x) \qquad (6)$$

$$Fb(x) = Fao(x) \times (1 - \beta x) \qquad (7)$$

Also, $Fao(x) = Fbo(x)$ \qquad (8)

From equations (6)–(8), $\beta$ is expressed as:

$$\beta = \frac{\{Fa(x) - Fb(x)\}}{\{Fa(x) + Fb(x)\}x} \qquad (9)$$

Figure 17C:
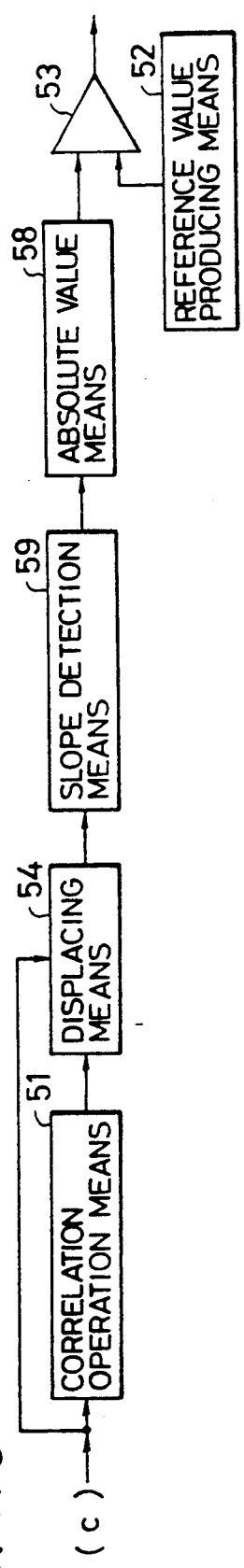

In FIG. 17C, correlation operation means 51 and displacing means 54 are the same as those of FIG. 17B. Slope detection means 59 receives from the displacing means 54 a pair of photoelectric outputs Fa(x) and Fb(x) of which the relative displacement amount has become zero as shown in FIG. 15C, and effects the operation of equation (9) by introducing a particular value into x, and obtains the slope $\beta$. Preferably, the particular value for "x" is the value at a location relatively spaced apart from the origin (x=0) in FIG. 15A, and a plurality of such values are chosen and the slope $\beta$ is found for each of those values, and the average value of them is finally used as $\beta$. Absolute value means 58 and comparing means 53 are the same as those of FIG. 17B.

Figure 18:
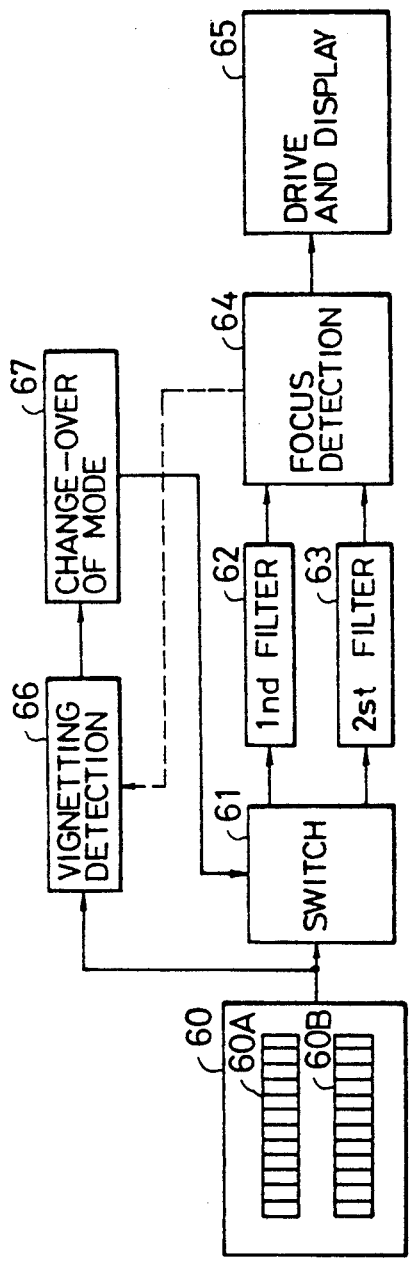
FIG. 18 is a block diagram showing still another embodiment of the present invention.
Figure 20:
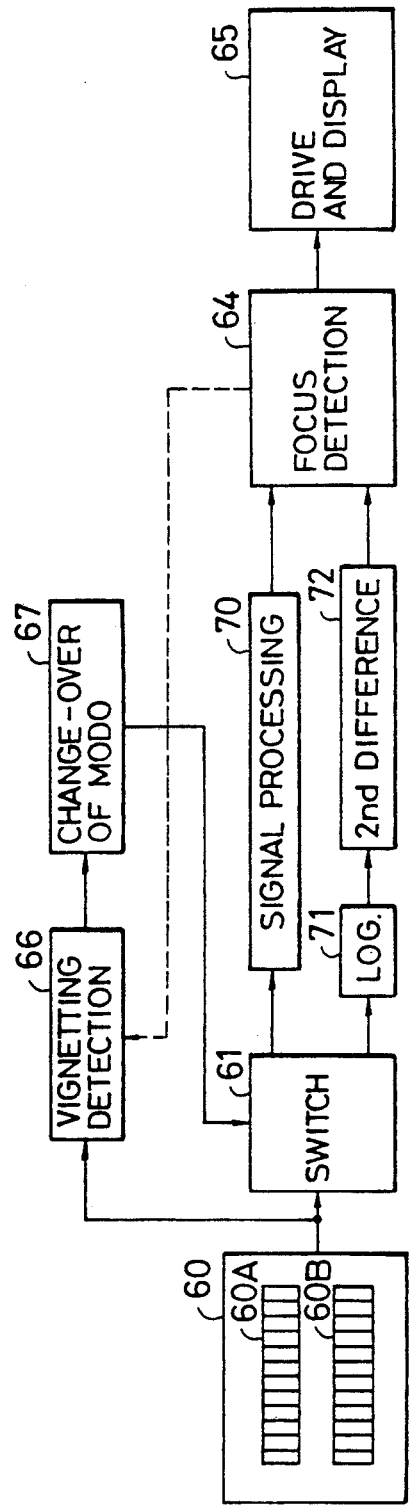
FIG. 20 is a block diagram showing yet still another embodiment of the present invention.

Reference is now had to FIGS. 18 and 20 to describe two further embodiments in which the reduction in focus detection accuracy resulting from vignetting described in connection with FIGS. 15A–15C is prevented.

In FIG. 18, a photoelectric unit 60 has first and second photoelectric element arrays 60A and 60B. These arrays 60A and 60B are the same as the first and second arrays 7A and 7B of FIG. 1 or the first arrays 34a, 35a, 36a and the second arrays 34b, 35b, 36b of FIG. 13. Switch means 61 receives a series of output signals a1, .

Figure 19A:
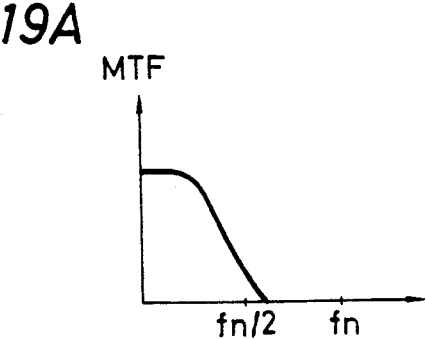
FIGS. 19A and 19B are graphs showing the characteristics of the filter means of FIG. 18.
Figure 19B:
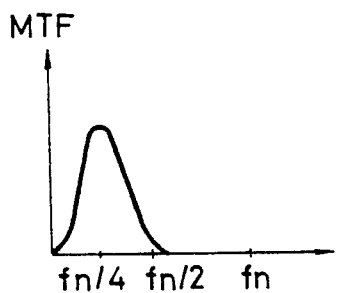

..., aN of the first array and a series of output signals b1, ..., bN of the second array from the photoelectric unit 60 and alternatively sends them to first filter means 62 and second filter means 63. The first filter means 62 has an MTF (modulation transfer function) characteristic which has pass band from DC component to frequency fn/2, as shown in FIG. 19A. In FIG. 19A, the abscissa represents spatial frequency and fn is 1/(2 d), where d is the pitch of the photoelectric elements of the photoelectric element array. Accordingly, this filter means 62 passes therethrough the components from the DC component to the vicinity of about fn/2, of the spatial frequency component of the optical image on the array which is included in the series of output signals. The second filter means 63 has an MTF characteristic that as shown in FIG. 19B, it passes therethrough the spatial frequency component in the vicinity of fn/4 and removes the DC component, the component in the vicinity thereof and the component of fn/2 or more. Focus detection means 64 is the same as the means 46 of FIG. 16, and it detects the relative displacement amount of the optical images on the arrays 60A and 60B, converts it into a defocus amount and puts out the same. Drive and display means 65 drives the photo-taking lens in response to the defocus signal and displays the focus adjusted state of the lens.

Vignetting detection means 66 is the same as the means 47 of FIG. 16, and mode change-over means 67 receives the output of the means 66 and sends a normal mode signal or a vignetting mode signal to the switch means 61. The switch means 61 sends the output signal of the photoelectric unit 60 to the first filter means 62 in response to the normal mode signal, and to the second filter means 63 in response to the vignetting mode signal.

The operation will hereinafter be described.

Let it be assumed that the switch means 61 selects the first filter means 62. The output signals from the pair of arrays 60A and 60B are filtered by the first filter means 62, and then enter the focus detection means 64. The means 64 calculates a defocus amount therefrom, and the means 65 effects the driving of the photo-taking lens and display in accordance with the defocus amount. The vignetting detection means 66 detects the degree of vignetting of the focus detecting light beam from said output signals, and the change-over means 67 produces a normal mode signal in accordance with the output of the means 66 when the degree of vignetting is small, and produces a vignetting mode signal when the degree of vignetting is great. The switch means 61 maintains the selection of the first filter means 62 in accordance with the normal mode signal, and selects the second filter means 63 in accordance with the vignetting mode signal. By the selection of the second filter means 63, the output signal from the photoelectric unit 60 is filtered in accordance with the MTF characteristic of FIG. 19B. Generally, the vignetting of the focus detecting light beam greatly affects the low frequency component including the DC component of the above-mentioned output signals, and its influence upon higher frequency components is very small. Accordingly, when the low frequency component is removed from the output signals by the second filter means 63, the filtered output signals are scarcely affected by vignetting. The focus detection means 64 calculates a defocus amount on the basis of the output of the second filter means 63, and the means 65 effects said driving and display in response to this defocus amount.

In FIG. 20, switch means 61 selects signal processing means 70 in response to the normal mode signal, and selects the series connecting member of logarithmic means 71 and second difference means 72 in response to the vignetting mode signal. The signal processing means 70 amplifies or suitably filters the input signal. The combination of the logarithmic means 71 and the second difference means 72 has the function of very effectively removing the components which are included in a series of output signals a1, ..., aN of a first array 60A and a series of output signals b1, ..., bN of a second array 60B and which have been affected by vignetting. The logarithmic means 71 converts the time-serially sent output signals a1, ..., aN and b1, ..., bN into logarithms log a1, ..., log aN and log b1, ..., log bN. These logarithmic outputs log a1, ..., log aN and log b1, ..., log bN are defined as A1, ..., AN and B1, ..., BN, respectively. The second difference means 72 finds the second differences of the logarithmic outputs A1, ..., AN and B1, ..., BN time-serially sent from the logarithmic means 71. The second differences mean, for example, (A1−2A2+A3), (A2−2A3+A4), ... when the series of original signals are A1, A2, A3, A4, .... These second differences correspond to the first differences of new original signals when the first difference signals (A2−A1), (A3−A2), (A4−A3), ... of the original signals A1, A2, A3, A4, ... are found and when these first difference signals (A2−A1), (A3−A2), ... are the new original signals. The differences are not limited to the differences (A2−A1), (A3−A2), ... between adjacent data as described above, but may also be the differences (A3−A1), (A4−A2), ... of every other data or the differences (A4−A1), (A5−A2), ... of every two data.

The action of the second difference means is to filter the input signal in accordance with a predetermined MTF characteristic The MTF characteristic of FIG. 19B can be obtained by second difference means which finds the second differences of every other data, i.e., (A1−2A3+A5), (A2−2A4+A6).

Figure 21:
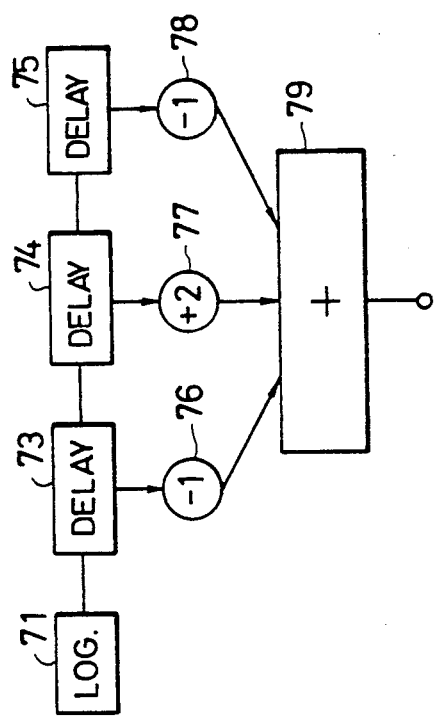
FIG. 21 is a block diagram showing a specific example of the construction of the second difference means of FIG. 20.

FIG. 21 shows an example of the second difference means 72. The time-serial signals A1, ... AN and B1, ..., BN from the logarithmic means 71 are successively sent to series-connected delay means 73, 74 and 75. Multiplication means 76, 77 and 78 have coefficients −1, 2 and −1, respectively, and multiply the contents of the delay means 73, 74 and 75, for example, A3, A2 and A1, by their coefficients −1, 2 and −1, respectively. Addition means 79 adds together the outputs of the multiplication means 76–78. Accordingly, the addition means 79 puts out second difference outputs (−A1+2A2−A3), (−A2+2A3−A4), ... in succession as signals A1, A2, A3, A4 are successively input from the logarithmic means 71 to the delay means.

It will hereinafter be illustrated that the logarithmic means 71 and the second difference means 72 reduce the influence of vignetting upon the output signal.

The photoelectric output patterns Fa(x) and Fb(x) of FIG. 15C are expressed as follows by substituting F(x) for Fao(x) of equation (6) and Fbo(x) of equation (7):

$$Fa(x) = F(x) \times (1 + \beta x)$$

$$Fb(x) = F(x) \times (1 - \beta x)$$

After the logarithms of Fa(x) and Fb(x) have been obtained, the second difference outputs $\Delta^2 Fa(x)$ and $\Delta^2 Fb(x)$ at two points spaced apart by a predetermined amount d are as follows:

$$\Delta^2 Fa(x) = -\log Fa(x-d) + 2\log Fa(x) - \log Fa(x+d)$$
$$= 2\log F(x) - \log F(x-d) - \log F(x+d) +$$
$$\log \frac{(1+\beta x)^2}{(1+\beta x - \beta d)(1+\beta x + \beta d)}$$

$$\Delta^2 Fb(x) = 2\log F(x) - \log F(x-d) - \log F(x+d) +$$
$$\log \frac{(1-\beta x)^2}{(1-\beta x - \beta d)(1-\beta x + \beta d)}$$

The difference $D(x)$ between these second difference outputs $\Delta^2 Fa(x)$ and $\Delta^2 Fb(x)$ is:

$$D(x) = \log \frac{(1+\beta x)^2 (1-\beta x + \beta d)(1-\beta x - \beta d)}{(1-\beta x)^2 (1+\beta x - \beta d)(1+\beta x + \beta d)}$$

An attempt is made to find this difference $D(x)$ from a specific example of numerical values. When the length of each photoelectric element array is 6 mm and d=0.6 mm and vignetting functions $Va(x)$ and $Vb(x)$ at the opposite ends $x=\pm 3$ mm of the array whereat the influence of vignetting is greatest are greater or smaller by 30% than the center of the array, the difference $D(x)$ at the opposite ends of the array is about $-0.005$.

This value $-0.005$ is appreciably smaller than in a case where no means is provided for reducing the influence of vignetting, and further, is greatly smaller than the similar value $D(3) = -0.13$ by a combination of the logarithmic means and the first difference means which can reduce the influence of vignetting, and it can be seen from this that the combination of the logarithmic means and the second difference means in accordance with the present invention is very effective for the removal of the influence of vignetting.

The action of the arrangement of FIG. 20 is similar to that of the arrangement of FIG. 18, and the defocus amount is calculated on the basis of the output signals a1, . . . , aN and b1, . . . , bN processed by the signal processing means 70 when the normal mode signal is produced, and is calculated on the basis of the output signals processed by the means 71 and 72 when the vignetting mode signal is produced.

In FIGS. 18 and 20, the vignetting detection means 66 receives as input the output produced by the focus detection means 64, for example, the image displacement amount Lm, as indicated by dotted line, and can detect vignetting on the basis thereof. In this case, whether the influence of vignetting has been sufficiently removed in the state in which the second filter 63 and the logarithmic means 71 are selected can be detected, and if the influence of vignetting has not been removed, a warning can be produced by the use of means similar to the warning means 50 of FIG. 16.

In the foregoing, change-over of the filter means, etc. has been effected when the degree of vignetting is great, but instead thereof or in addition thereto, the area of the series of output signals used in the focus detection means may be changed. More particularly, as shown in FIG. 15A, the influence of vignetting is small in the vicinity of the center of the photoelectric element array and becomes greater toward the opposite ends thereof and therefore, the output signals corresponding to the vicinity of the center of the array is less affected by vignetting. Thus, during the normal mode, the focus detection means is caused to calculate the defocus amount by the use of all of the series of output signals and, during the vignetting mode, the focus detection means is caused to calculate the defocus amount on the basis of only the output signals of said series of output signals in the vicinity of the center.

Figure 22:
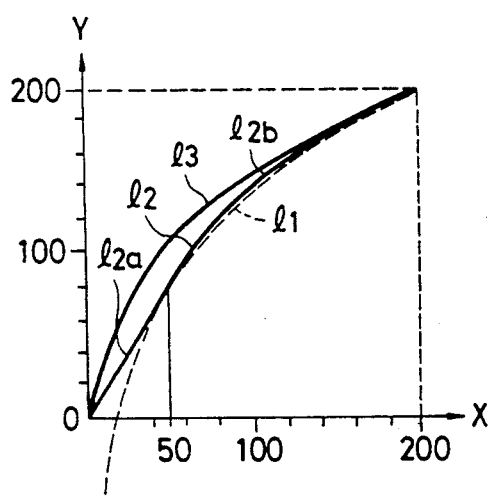
FIG. 22 is a graph showing the logarithmic conversion characteristic.

Logarithmic conversion means used for the logarithmic means 71 of FIG. 20 usually converts an input X into an output Y by the logarithmic conversion characteristic indicated by dotted line $l_1$ in FIG. 22. However, in the conversion means having such a conversion characteristic $l_1$, the output Y will assume a great negative value if the input X becomes smaller, and it will exceed the dynamic range of the subsequent circuit (in FIG. 20, the second difference circuit 72) which receives this output Y, thereby reducing the focus detection accuracy.

To avoid such an inconvenience, use may be made of the conversion characteristic indicated by solid line $l_2$ or $l_3$ in FIG. 22. This conversion characteristic $l_2$ comprises a straight line portion $l_{2a}$ in the area wherein the input X is small and a logarithmic conversion curve portion $l_{2b}$ in the area wherein the input X is great. The straight line portion $l_{2a}$ passes through the origin O and smoothly connects to the logarithmic conversion curve portion $l_{2b}$. This characteristic $l_2$ may be mathematically expressed as follows.

The relation in the logarithmic conversion curve portion $l_{2b}$ is:

$$Y = \frac{B}{\log(A/E)} \log(X/E)$$

($X \geq E \cdot e$, where e is the value of the bottom of the logarithm)

The relation in the straight line portion $l_{2a}$ is:

$$Y = \frac{B}{\log(A/E)} \cdot \frac{X}{E \cdot e}$$

$(X < E \cdot e)$

The characteristic $l_2$ is such that in the equations above, A=200, E=18.5 and $E \cdot e \approx 50$.

The series of signals input to such logarithmic conversion means are predetermined so that the average value thereof is substantially the median of the input range $0 < X < A$ (=200) of the conversion means, namely, A/2.

In the above equations, the parameter E is an amount related to the degree of curvature of LOG curve. Where E is too great, the curve $l_2$ shown in FIG. 22 becomes approximate to a straight line as a whole and cannot sufficiently display the effect by the LOG characteristic, and where E is too small, the curvature of the curve $l_2$ becomes sharp and the output Y is extremely compressed relative to the input X and the fluctuation range of the output Y becomes too narrow.

With the foregoing fact taken into account, where equation (6) is applied, it is necessary that the relation between the parameter E and A be $$\frac{1}{200} \lesssim \frac{E}{A} \lesssim \frac{25}{200}$$

and it has been found from the result of the experiment carried out with respect to various objects to be photographed that a good result is obtained for $$\frac{5}{200} \lesssim \frac{E}{A} \lesssim \frac{25}{200}$$

and a very good result is obtained for $$\frac{10}{200} \lesssim \frac{E}{A} \lesssim \frac{20}{200}.$$

The logarithmic conversion curve $l_3$ of FIG. 22 has been obtained by parallel-moving the curve $l_1$ in the direction of X-axis so that when $X=0$, $Y=0$, and may be mathematically expressed as follows:

$$Y = \frac{B}{\log\{(A/E) + 1\}} \cdot \log\{(X/E) + 1\}$$

The curve $l_3$ refers to a case where $A=200$ and $B=200$ and $E=18.5$.

In the above equation, the parameter E/A may preferably be $$\frac{1}{200} \lesssim \frac{E}{A} \lesssim \frac{10}{200}.$$

The conditions for preventing the preferable logarithmic conversion characteristics as indicated, for example, by the characteristics $l_2$ and $l_3$ are as follows:

① The input X and the output Y of the logarithmic conversion means should be in the relation of monotonous increase or monotonous decrease. If not so, there will be provided a result similar to the result that the optical image on the photoelectric element array has been photoelectrically converted in locally distorted manner.

② When the ranges of the input X and the output Y are $X_1 \leq X \leq X_2$ and $Y_1 \leq Y \leq Y_2$, in order that the output Y may not be excessively compressed in a part of the input range, it is desirable that $$\frac{0.3(Y_2 - Y_1)}{X_2 - X_1} \lesssim \frac{dY}{dX} \lesssim \frac{Y_2 - Y_1}{X_2 - X_1},$$

where $$\frac{dY}{dX}$$

is a differential coefficient in $$X = \frac{X_2 + X_1}{2}.$$

Figure 23A:
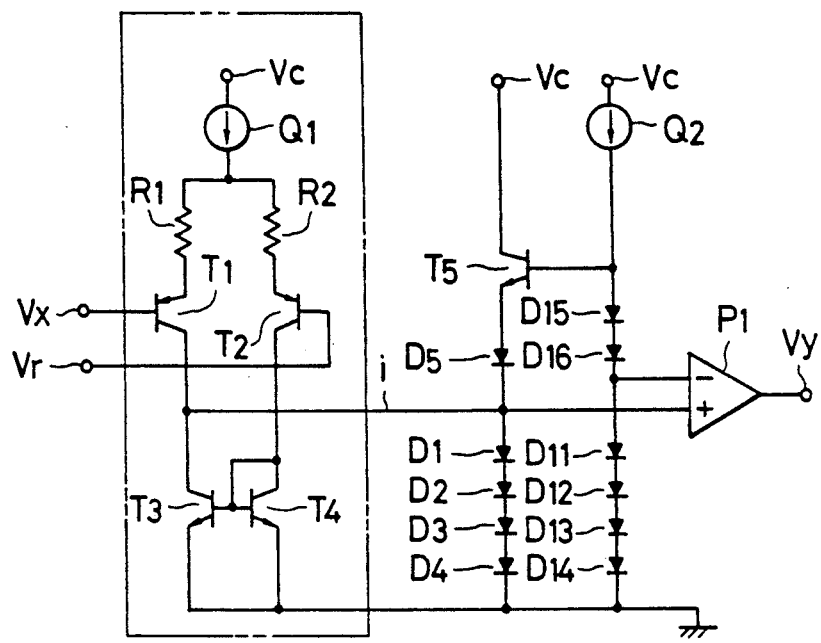
FIGS. 23A and 23B are circuit diagrams showing a logarithmic conversion circuit.
Figure 23B:
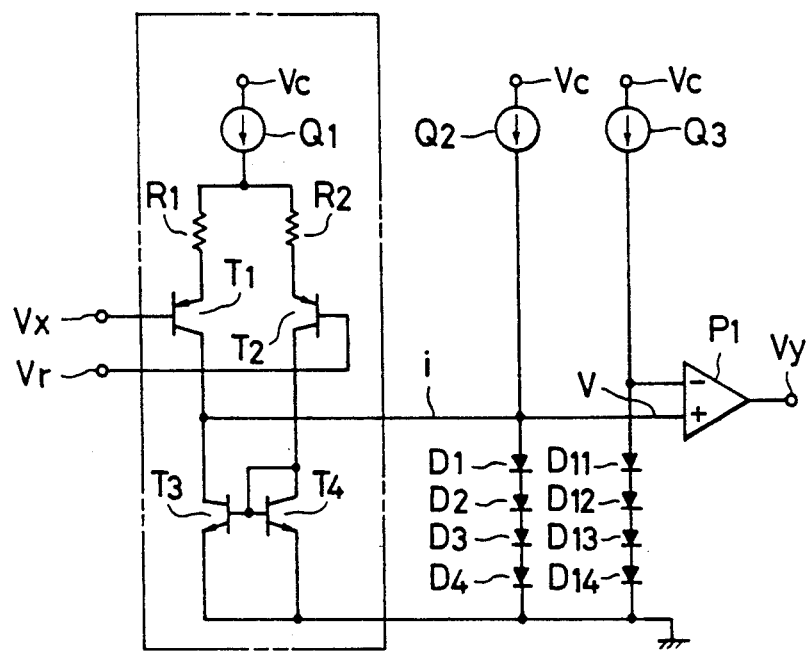

FIGS. 23A and 23B show specific examples of the circuit of conversion means having logarithmic conversion characteristics $l_2$ and $l_3$. A voltage-current converting circuit comprises resistors R1, R2, transistors T1, T2, T3, T4 and a constant current source $\Omega 1$, and converts the difference between an input voltage Vx and a reference voltage V$\gamma$ into a current i proportional thereto.

The diodes D1-D5, D11-D16, transistor T5, constant current source Q2 and operational amplifier P1 of FIG. 23A convert the input current i into an output voltage Vy in accordance with the characteristic $l_2$. The diodes D1-D4, D11-D14, constant current sources Q2, Q3 and operational amplifier P1 of FIG. 23B convert the input current i into an output voltage Vy in accordance with the characteristic $l_3$.

Figure 24:
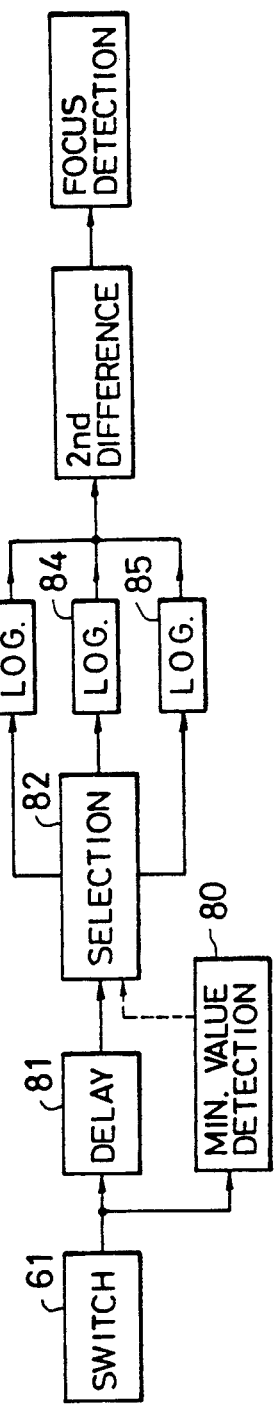
FIG. 24 is a block diagram showing a modification of the logarithmic means of FIG. 20.

FIG. 24 shows an example in which a plurality of logarithmic conversion means having different characteristics are prepared and the logarithmic conversion means are selected in accordance with the magnitudes of the series of output signals from the photoelectric element array.

Figure 25:
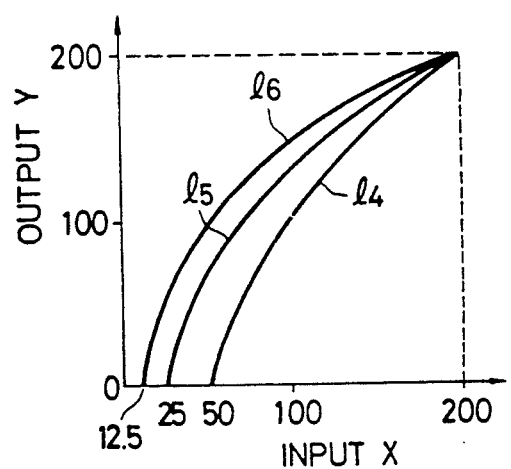
FIG. 25 is a graph showing the logarithmic conversion characteristic.

In FIG. 24, minimum value detection means 80 detects the minimum values of the series of output signals a1, ..., aN and b1, ..., bN from the switch means 61 (FIG. 20). It is to be understood that the magnitudes of these output signals are within a predetermined range, for example, the range of 0-200 and the average value thereof is approximately 100, by the control of the charge accumulating time of a photoelectric element array such as a CCD type image sensor. The series of output signals are delayed by a delay circuit 81 until the minimum value detection circuit 80 detects the minimum values, whereafter they are input to selection means 82. The selection means 82 alternatively selects logarithmic conversion means 83, 84, 85 in accordance with the output of the minimum value detection means 80. The means 83, 84 and 85 have conversion characteristics $l_4$, $l_5$ and $l_6$, respectively, shown in FIG. 25. The characteristic $l_4$ converts an input in the range of 50-200 into an output in the range of 0-200, the characteristic $l_5$ converts an input in the range of 20-200 into an output in the range of 0-200, and the characteristic $l_6$ converts an input in the range of 12.5-200 into an output in the range of 0-200 and an input in the range of 0-12.5 into an output of 0. When the detection means 80 detects that the minimum value of the series of output signals is 50 or more, the selection means 82 selects the conversion means 83 and causes said output signals to be converted in accordance with the characteristic $l_4$. Likewise, when the minimum value is 25-50, the conversion means 84 is selected and, when the minimum vlaue is less than 25, the conversion means 85 is selected. The logarithmically converted output signals are sent to the second difference means 72.

In this manner, the conversion means are selected in accordance with the distribution of the input signal and therefore, optimum logarithmic conversion can be accomplished. Such conversion means may be constituted by circuits, or may be stored as a logarithmic conversion table in the ROM within a microprocessor.

What is claimed is:

1. A camera having a photo-taking lens and comprising:

image sensor means having a first light-receiving area and a second light-receiving area;

optical means for directing two light beams from an object to be photographed to said first light-receiving area and said second light-receiving area, respectively, said image sensor means generating outputs according to intensity distributions of light incident on said light-receiving areas;

displacement amount calculating means for calculating a displacement amount of the intensity distributions of light incident on said first and second light-receiving areas in response to outputs of said image sensor means;

main area detection means for detecting a position of a main area in light from the object incident upon at least one of said light-receiving areas and for generating a corresponding detection signal; and focus detection means for adjusting the calculated displacement amount in response to said detection signal and detecting focus of the photo-taking lens.

2. A camera having a photo-taking lens and comprising:

image sensor means having a first light-receiving area and a second light-receiving area;

optical means for directing two light beams from an object to be photographed to said first light-receiving area and said second light-receiving area, respectively, said image sensor means generating outputs according to intensity distributions of light incident on said light-receiving areas;

means for detecting the depth of said object to be photographed in response to outputs of said image sensor means and generating a depth signal according to the detected depth;

drive means for driving the photo-taking lens; and calculation means for calculating a driving amount of the photo-taking lens by said drive means in response to said depth signal.

3. A camera having a photo-taking lens and comprising:

image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;

optical means for directing two light beams from an object to be photographed to said first light-receiving area and said second light-receiving area, respectively, said image sensor means being responsive to an intensity distribution of the light incident on said photoelectric conversion elements;

displacement detection means responsive to said image sensor means for detecting an amount of displacement between an intensity distribution of one of said beams at each of a plurality of sub-areas in said first light-receiving area and an intensity distribution of the other of said beams in said second light-receiving area and for generating a plurality of displacement detection signals by at least a portion of said sub-areas in said first light-receiving area and at least a portion of said second light-receiving area, each of which indicates a detected amount of displacement;

depth detection means for detecting the depth of the object to be photographed and producing a depth detection signal; and focus detection means for producing a focus detection signal conforming to the focus of said photo-taking lens on the basis of said plurality of displacement detection signals and said depth detection signal.

4. A camera having a photo-taking lens and comprising:

image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;

optical means for directing two light beams from an object to be photographed to said first light-receiving area and said second light-receiving area, respectively, said image sensor means being responsive to an intensity distribution of the light incident on said photoelectric conversion elements;

displacement detection means responsive to said image sensor means for detecting an amount of displacement between an intensity distribution of one of said beams at each of a plurality of sub-areas in said first light-receiving area and an intensity distribution of the other of said beams in said second light-receiving area and for generating a plurality of displacement detection signals by at least a portion of said sub-areas in said first light-receiving area and at least a portion of said second light-receiving area, each of which indicates a detected amount of displacement; and focus detection means for calculating an average value of amounts conforming to said plurality of displacement detection signals and producing a focus detection signal conforming to the focus of said photo-taking lens on the basis of the calculated average value.

5. A camera comprising:

image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;

optical means for directing two light beams from an object to be photographed to said first light-receiving area and said second light-receiving area, respectively, said image sensor means being responsive to an intensity distribution of the light incident on said photoelectric conversion elements;

displacement detection means responsive to said image sensor means for detecting an amount of displacement between the intensity distribution of one of said beams at each of a plurality of sub-areas in said first light-receiving area and the intensity distribution of the other of said beams in said second light-receiving area and for generating a plurality of displacement detection signals by at least a portion of said sub-areas in said first light-receiving area and at least a portion of said second light-receiving area, each of which indicates a detected amount of displacement; and focus detection means for calculating an average value of amounts conforming to said plurality of displacement detection signals except two of said plurality of displacement detection signals, one of which indicates a maximum amount in said plurality of displacement detection signals and the other of which indicates a minimum amount in said plurality of displacement detection signals.

6. A camera comprising:

image sensor means having a first light-receiving area and a second light-receiving area;

optical means for directing two light beams from an object to be photographed to said first light-receiving area and said second light-receiving area, respectively, said image sensor means generating outputs according to intensity distributions of light incident on said light-receiving areas;

displacement amount calculating means for calculating a displacement amount of the intensity distributions of light incident on said first and second light-receiving areas in response to said outputs of said image sensor means;

main area detection means responsive to said displacement amount calculating means for detecting the contrast of the object, detecting as said main area the highest contrast area of the object, and generating a detection signal; and focus detection means for correcting the calculated displacement amount of the basis of said detection signal, and producing a focus detection signal.

7. A camera according to claim 3, wherein said depth detection means generates said depth detection signal based on the amount of the detected depth, and wherein said camera further comprises driving means for driving said photo-taking lens, and said focus detection means calculates an amount of driving of said photo-taking lens by said drive means in response to said depth detection signal.

8. A camera according to claim 3, wherein said depth detection means generates said depth detection signal according to an amount of depth of said object based on a displacement detection signal which shows maximum displacement among said plurality of displacement detection signals and a displacement detection signal which shows minimum displacement among said plurality of displacement signals.

9. A camera according to claim 8, wherein said camera further comprises drive means for driving said photo-taking lens and wherein said focus detection means calculates an amount of driving of said photo-taking lens in response to said depth detection signal.

10. A camera according to claim 9, wherein said focus detecting means comprises means for comparing the level of said depth detection signal with a predetermined level and generating a comparison signal.

11. A camera according to claim 10, wherein said focus detection means has a first control mode for selecting one displacement detection signal from said plurality of displacement detection signals and calculating an amount of driving of said photo-taking lens based on the selected displacement detection signal, and a second control mode for calculating an average of a plurality of displacement amounts shown by said plurality of displacement detection signals and calculating an amount of driving of said photo-taking lens based on the calculated average, and wherein said focus detection means operates in said first control mode when the level of said depth detection signal is higher than said predetermined level and in said second control mode when the level of said depth detection signal is lower than said predetermined level.

12. A camera according to claim 11, wherein said focus detection means includes means for detecting the contrast of said object and generating a contrast signal according to the detected contrast and selects one displacement detection signal from said plurality of displacement detection signals in response to said contrast signal during the operation in said first control mode.

13. A camera according to claim 1, wherein said main area detection means detects as said position, the position of an area of light corresponding to the highest contrast area of the object.

14. A camera having a photo-taking lens and comprising:

image sensor means having a first light-receiving area and a second light-receiving area;

optical means for directing a first portion and a second portion of light from an object to be photographed to said first light-receiving area and said second light-receiving area, respectively, said image sensor means generating outputs according to intensity distributions of light incident on said light-receiving areas;

displacement amount calculating means for calculating a displacement amount of the intensity distributions of light incident on said first and second light-receiving areas in response to outputs of said image sensor means;

main area detection means for detecting a position of a main area in the light from the object directed to said light-receiving areas by said optical means and for generating a corresponding detection signal; and focus detection means for adjusting the calculated displacement amount in response to said detection signal and detecting focus of the photo-taking lens.

15. A camera according to claim 14, wherein said main area detection means detects as said position, the position of an area of light corresponding to the highest contrast area of the object.

16. A camera having a photo-taking lens and comprising:

image sensor means having a first light-receiving area and a second light-receiving area;

optical means for directing a first portion and a second portion of light from an object to be photographed to said first light-receiving area and said second light-receiving area, respectively, said image sensor means generating outputs according to intensity distributions of light incident on said light-receiving areas;

means for detecting the depth of said object to be photographed in response to outputs of said image sensor means and generating a depth signal according to the detected depth;

drive means for driving the photo-taking lens; and calculation means for calculating a driving amount of the photo-taking lens by said drive means in response to said depth signal.

17. A camera comprising:

image sensor means having a first light-receiving area and a second light-receiving area;

optical means for directing a first portion and a second portion of light from an object to be photographed to said first light-receiving area and said second light-receiving area, respectively, said image sensor means generating outputs according to intensity distributions of light incident on said light-receiving areas;

displacement amount calculating means for calculating a displacement amount of the intensity distributions of light incident on said first and second light-receiving areas on response to said outputs of said image sensor means;

main area detection means responsive to said displacement amount calculating means for detecting the contrast of the object, detecting as said main area the highest contrast area of the object, and generating a detection signal; and focus detection means for correcting the calculated displacement amount on the basis of said detection signal, and producing a focus detection signal.

18. A camera having a photo-taking lens and comprising:
- image sensor means having a first light-receiving area and a second light-receiving area;
- optical means for directing a first portion and a second portion of light from an object to be photographed to said first light-receiving area and said second light-receiving area, respectively, said image sensor means generating outputs according to the intensity distributions of light incident on said light-receiving areas;
- displacement amount calculating means for calculating a displacement amount of the intensity distributions of light incident on said first and second light-receiving areas in response to outputs of said image sensor means;
- main area detection means for detecting a position of a main area in the light from the object directed to said light receiving areas by said optical means; and
- means responsive to said main area detection means and said displacement amount calculating means for calculating a defocus amount of the photo-taking lens based on the calculated displacement amount and on a correction factor related to said position of said main area.

19. A camera according to claim 18, wherein said main area detection means detects as said position, the position of an area of light corresponding to the highest contrast area of the object.

20. A camera having a photo-taking lens and comprising:
- image sensor means having a first light-receiving area and a second light-receiving area;
- optical means for directing a first portion and a second portion of light from an object to be photographed to said first light-receiving area and said second light-receiving area, respectively, said image sensor means generating outputs according to intensity distributions of light incident on said light-receiving areas;
- displacement amount calculating means for calculating a displacement amount of the intensity distributions of light incident on said first and second light-receiving areas in response to said outputs of said image sensor means;
- main area detection means responsive to said displacement amount calculating means for detecting the contrast of the object, and detecting as said main area the highest contrast area of the object; and
- means responsive to said displacement amount calculating means and said main area detection means for calculating a defocus amount of said photo-taking lens based on the calculated displacement amount and a correction factor related to a position of said main area.

21. A camera having a photo-taking lens and comprising:
- image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;
- optical means for directing a first portion and a second portion of light from an object to be photographed to said first light-receiving area and said second light-receiving area, respectively, said image sensor means being responsive to an intensity distribution of the light incident on said photoelectric conversion elements;
- displacement detection means responsive to said image sensor means for detecting an amount of displacement between an intensity distribution of said first portion of light at each of a plurality of sub-areas in said first light-receiving area and an intensity distribution of said second portion of light in said second light-receiving area and for generating a plurality of displacement detection signals by at least a portion of said sub-areas in said first light-receiving area and at least a portion of said second light-receiving area, each of which indicates a detected amount of displacement;
- depth detection means for detecting the depth of the object to be photographed and producing a depth detection signal; and
- focus detection means for producing a focus detection signal conforming to the focus of said photo-taking lens on the basis of said plurality of displacement detection signals and said depth detection signal.

22. A camera having a photo-taking lens and comprising:
- image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;
- optical means for directing a first portion and a second portion of light from an object to be photographed to said first light-receiving area and said second light-receiving area, respectively, said image sensor means being responsive to an intensity distribution of the light incident on said photoelectric conversion elements;
- displacement detection means responsive to said image sensor means for detecting an amount of displacement between an intensity distribution of said first portion of light at each of a plurality of sub-areas in said first light-receiving area and an intensity distribution of said second portion of light in said second light-receiving area and for generating a plurality of displacement detection signals by at least a portion of said sub-areas in said first light-receiving area and at least a portion of said second light-receiving area, each of which indicates a detected amount of displacement; and
- focus detection means for calculating an average value of amounts conforming to said plurality of displacement detection signals and producing a focus detection signal conforming to the focus of said photo-taking lens on the basis of the calculated average value.

23. A camera comprising:
- image sensor means having a plurality of photoelectric conversion elements in a light-receiving portion thereof, said photoelectric conversion elements including a one-dimensional array of said elements in a first light-receiving area of said light-receiving portion and a one-dimensional array of said elements in a second light-receiving area of said light-receiving portion;

optical means for directing a first portion and a second portion of light from an object to be photographed to said first light-receiving area and said second light-receiving area, respectively, said image sensor means being responsive to an intensity distribution of the light incident on said photoelectric conversion elements;

displacement detection means responsive to said image sensor means for detecting an amount of displacement between an intensity distribution of said first portion of light at each of a plurality of sub-areas in said first light-receiving area and an intensity distribution of said second portion of light in said second light-receiving area and for generating a plurality of displacement detection signals by at least a portion of said sub-areas in said first light-receiving area and at least a portion of said second light-receiving area, each of which indicates a detected amount of displacement; and focus detection means for calculating an average value of amounts conforming to said plurality of displacement detection signals except two of said plurality of displacement detection signals, one of which indicates a maximum amount in said plurality of displacement detection signals and the other of which indicates a minimum amount in said plurality of displacement detection signals.

* * * * *